United States Patent
Asakawa et al.

(10) Patent No.: US 10,505,175 B2
(45) Date of Patent: Dec. 10, 2019

(54) SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicants: Murata Manufacturing Co., Ltd., Kyoto (JP); Hydro-Quebec, Montreal (CA)

(72) Inventors: Yuichiro Asakawa, Saitama (JP); Shinichi Uesaka, Quebec (CA); Jean-Christophe Daigle, Quebec (CA); Karim Zaghib, Quebec (CA)

(73) Assignee: Murata Manufacturing Co., Ltd., Kyoto (JP)

(*) Notice: Subject to any disclaimer, the term of this patent is extended or adjusted under 35 U.S.C. 154(b) by 179 days.

(21) Appl. No.: 15/674,989

(22) Filed: Aug. 11, 2017

(65) Prior Publication Data

US 2018/0183034 A1     Jun. 28, 2018

Related U.S. Application Data

(60) Provisional application No. 62/438,058, filed on Dec. 22, 2016.

(51) Int. Cl.
*H01M 2/34* (2006.01)
*H01M 10/0525* (2010.01)
(Continued)

(52) U.S. Cl.
CPC ............ *H01M 2/34* (2013.01); *B60L 3/04* (2013.01); *B60L 50/64* (2019.02); *B60L 58/21* (2019.02);
(Continued)

(58) Field of Classification Search
CPC .......... H01M 2/34; H01M 10/0525; H01M 10/0568; H01M 10/0569; H01M 10/486;
(Continued)

(56) References Cited

U.S. PATENT DOCUMENTS

| | | | |
|---|---|---|---|
| 2005/0221188 A1 | 10/2005 | Takami et al. | |
| 2011/0217591 A1* | 9/2011 | Heo ............... | H01M 2/204 429/211 |
| 2011/0294007 A1* | 12/2011 | Hosaka ............ | H01M 2/08 429/210 |

FOREIGN PATENT DOCUMENTS

| | | |
|---|---|---|
| JP | 2012-129095 A | 7/2012 |
| KR | 10-2008-0099890 A | 11/2008 |

OTHER PUBLICATIONS

European Patent Office, International Search Report for PCT Application No. PCT/JP2017/031075 (related to above-captioned patent application), dated Nov. 9, 2017.

* cited by examiner

*Primary Examiner* — Osei K Amponsah
(74) *Attorney, Agent, or Firm* — K&L Gates LLP

(57) ABSTRACT

A secondary battery includes: a cathode including a cathode current collector and a first cathode active material layer provided on the cathode current collector; an anode including an anode current collector and a first anode active material layer provided on the anode current collector to face the first cathode active material layer and including a titanium-containing compound; an intermediate electrode provided between the cathode and the anode and including an intermediate current collector, a second anode active material layer provided on the intermediate current collector to face the first cathode active material layer and including the titanium-containing compound, and a second cathode active material layer provided on the intermediate current (Continued)

collector to face the first anode active material layer; and an electrolytic solution including a solvent and an electrolyte salt and having number of molecules of the electrolyte salt equal to or larger than number of molecules of the solvent.

11 Claims, 4 Drawing Sheets

(51) Int. Cl.

| | | |
|---|---|---|
| *H01M 10/0568* | (2010.01) | |
| *H01M 4/485* | (2010.01) | |
| *H01M 4/58* | (2010.01) | |
| *H01M 10/48* | (2006.01) | |
| *H01M 10/04* | (2006.01) | |
| *B60L 50/64* | (2019.01) | |
| *B60L 58/21* | (2019.01) | |
| *H01M 10/052* | (2010.01) | |
| *B60L 3/04* | (2006.01) | |
| *H01M 10/0569* | (2010.01) | |
| *B25F 5/00* | (2006.01) | |
| *H01M 4/02* | (2006.01) | |
| *H01M 10/42* | (2006.01) | |

(52) U.S. Cl.
CPC ......... *H01M 4/485* (2013.01); *H01M 4/5825* (2013.01); *H01M 10/044* (2013.01); *H01M 10/052* (2013.01); *H01M 10/0525* (2013.01); *H01M 10/0568* (2013.01); *H01M 10/0569* (2013.01); *H01M 10/486* (2013.01); *B25F 5/00* (2013.01); *H01M 2004/029* (2013.01); *H01M 2010/4271* (2013.01); *H01M 2220/10* (2013.01); *H01M 2220/20* (2013.01); *H01M 2220/30* (2013.01); *H01M 2300/004* (2013.01); *Y02E 60/122* (2013.01); *Y02T 10/7011* (2013.01)

(58) Field of Classification Search
CPC ............... H01M 4/485; H01M 4/5825; H01M 2010/4271
See application file for complete search history.

SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS-REFERENCE TO RELATED APPLICATION

This application claims priority to U.S. Provisional Patent Application No. 62/438,058, filed on Dec. 22, 2016, the contents of which are incorporated by reference herein it its entirety.

BACKGROUND

Various electronic apparatuses such as mobile phones have been widely used, and it has been demanded to further reduce size and weight of the electronic apparatuses and to achieve their longer lives. Accordingly, small and lightweight secondary batteries that have ability to achieve high energy density have been developed as power sources for the electronic apparatuses.

Note that applications of the secondary batteries are not limited to the electronic apparatuses described above, and it has been also considered to apply the secondary batteries to various other applications. Examples of such other applications may include: a battery pack attachably and detachably mounted on, for example, an electronic apparatus; an electric vehicle such as an electric automobile; an electric power storage system such as a home electric power server; and an electric power tool such as an electric drill.

The secondary battery includes a cathode, an anode, and electrolytic solution. The configuration of the secondary battery exerts a large influence on battery characteristics. Accordingly, various studies have been conducted on the configuration of the secondary battery.

More specifically, in order to obtain a high voltage, a bipolar secondary battery has been proposed (refer to International Publication No. WO 2010/010717). In the bipolar secondary battery, an intermediate electrode is provided between a cathode and an anode, and the intermediate electrode includes a cathode active material layer and an anode active material layer.

SUMMARY

Specific proposals have been made in order to improve battery characteristics of the secondary battery; however, the battery characteristics of the secondary battery are not sufficient yet. For this reason, there is still room for improvement.

It is therefore desirable to provide a secondary battery that makes it possible to achieve superior battery characteristics, and a battery pack, an electric vehicle, an electric power storage system, an electric power tool, and an electronic apparatus.

According to an embodiment of the technology, there is provided a secondary battery including: a cathode, an anode, an intermediate electrode, and an electrolytic solution. The cathode includes a cathode current collector and a first cathode active material layer, and the first cathode active material is provided on the cathode current collector. The anode includes an anode current collector and a first anode active material layer, and the first anode active material layer is provided on the anode current collector to face the first cathode active material layer and includes a titanium-containing compound. The intermediate electrode is provided between the cathode and the anode and includes an intermediate current collector, a second anode active material layer, and a second cathode active material layer. The second anode active material layer is provided on the intermediate current collector to face the first cathode active material layer and includes the titanium-containing compound. The second cathode active material layer is provided on the intermediate current collector to face the first anode active material layer. The electrolytic solution includes a solvent and an electrolyte salt and has number of molecules of the electrolyte salt equal to or larger than number of molecules of the solvent.

According to respective embodiments of the technology, there are provided a battery pack, an electric vehicle, an electric power storage system, an electric power tool, and an electronic apparatus each of which includes a secondary battery, and the secondary battery has a configuration similar to that of the foregoing secondary battery according to the embodiment of the technology.

According to the secondary battery of the embodiment of the technology, each of the anode and the intermediate electrode includes the titanium-containing compound, and in the electrolytic solution, the number of molecules of the electrolyte salt is equal to or larger than the number of molecules of the solvent, which makes it possible to achieve superior battery characteristics. Moreover, in each of the battery pack, the electric vehicle, the electric power storage system, the electric power tool, and the electronic apparatus of the respective embodiments of the technology, similar effects are achievable.

Note that effects described here are non-limiting. Effects achieved by the technology may be one or more of effects described in the technology.

It is to be understood that both the foregoing general description and the following detailed description are exemplary, and are provided to provide further explanation of the technology as claimed.

BRIEF DESCRIPTION OF THE DRAWINGS

The accompanying drawings are included to provide a further understanding of the technology, and are incorporated in and constitute a part of this specification. The drawings illustrate embodiments and, together with the specification, serve to explain the principles of the technology.

DETAILED DESCRIPTION

In the following, some embodiments of the technology are described in detail with reference to drawings. It is to be noted that description is given in the following order.
1. Secondary Battery
1-1. Configuration
1-2. Operation
1-3. Manufacturing Method
1-4. Action and Effects
2. Modification Examples
3. Applications of Secondary Battery
3-1. Battery Pack (Single Battery)
3-2. Battery Pack (Assembled Battery)
3-3. Electric Vehicle
3-4. Electric Power Storage System
3-5. Electric Power Tool

1. Secondary Battery

Description is given of a secondary battery according to an embodiment of the technology.

The secondary battery is a secondary battery using lithium as an electrode reactant. The electrode reactant is a material involving charge-discharge reaction. More specifically, the secondary battery may be, for example, a lithium-ion secondary battery in which battery capacity (capacity of an anode) is obtained with use of a lithium insertion phenomenon and a lithium extraction phenomenon.

The secondary battery described here is specifically a bipolar secondary battery in which an intermediate electrode is provided between a cathode and an anode.

<1-1. Configuration>

Figure 1:
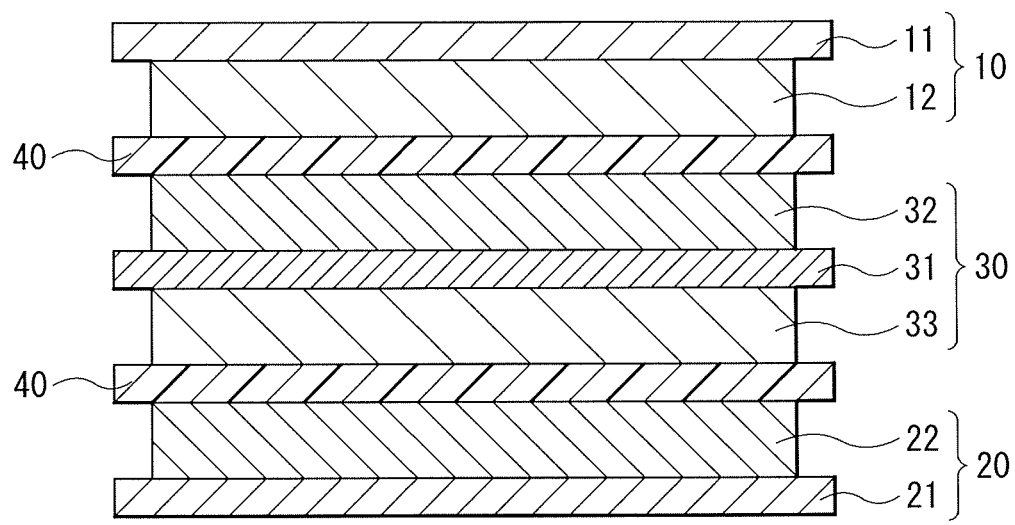
FIG. 1 is a cross-sectional view of a configuration of a secondary battery according to an embodiment of the technology.

First, description is given of a configuration of the secondary battery. FIG. 1 illustrates a cross-sectional configuration of the secondary battery.

The secondary battery may include, for example, a cathode 10, an anode 20, an intermediate electrode 30, and a separator 40, as illustrated in FIG. 1. Each of the cathode 10, the anode 20, the intermediate electrode 30, and the separator 40 may be impregnated with, for example, an electrolytic solution that is a liquid electrolyte.

The intermediate electrode 30 is disposed between the cathode 10 and the anode 20. The separator 40 may be inserted, for example, between the cathode 10 and the intermediate electrode 30, and the separator 40 may be inserted, for example, between the anode 20 and the intermediate electrode 30. In other words, the secondary battery may have, for example, a stacked structure in which the cathode 10, the anode 20, and the intermediate electrode 30 are stacked with the separators 40 in between.

[Cathode]

The cathode 10 includes a cathode current collector 11 and a first cathode active material layer 12 that is provided on the cathode current collector 11. In other words, the first cathode active material layer 12 is provided on one surface of the cathode current collector 11.

(Cathode Current Collector)

The cathode current collector 11 may include, for example, one or more of conductive materials. The kind of the conductive materials is not particularly limited; however, non-limiting examples of the conductive materials may include metal materials such as aluminum, nickel, and stainless steel. The cathode current collector 11 may be configured of a single layer or may be configured of multiple layers.

(First Cathode Active Material Layer)

The first cathode active material layer 12 may include, as a cathode active material, one or more of cathode materials that have ability to insert and extract lithium. Note that the first cathode active material layer 12 may further include one or more of other materials such as a cathode binder and a cathode conductor.

(Cathode Material: Lithium-Containing Compound)

The cathode material may be, for example, a lithium-containing compound, which makes it possible to achieve high energy density. The kind of the lithium-containing compound is not particularly limited; however, non-limiting examples of the lithium-containing compound may include a lithium-containing composite oxide and a lithium-containing phosphate compound.

The "lithium-containing composite oxide" is a generic name of an oxide that includes lithium (Li) and one or more other elements as constituent elements. The lithium-containing composite oxide may have, for example, one of crystal structures such as a layered rock-salt crystal structure and a spinel crystal structure.

The "lithium-containing phosphate compound" is a generic name of a phosphate compound that includes lithium and one or more other elements as constituent elements. The lithium-containing phosphate compound may have, for example, a crystal structure such as an olivine crystal structure.

It is to be noted that the "other elements" are elements other than lithium. The kind of the other elements is not particularly limited; however, non-limiting examples of the other elements may include elements that belong to Groups 2 to 15 in the long form of the periodic table of the elements. Specific but non-limiting examples of the other elements may include nickel (Ni), cobalt (Co), manganese (Mn), and iron (Fe), which make it possible to obtain a high voltage.

Non-limiting examples of the lithium-containing composite oxide having the layered rock-salt crystal structure may include compounds represented by the following formulas (11) to (13).

$$Li_aMn_{(1-b-c)}Ni_bM11_cO_{(2-d)}F_e \quad (11)$$

where M11 is one or more of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W), "a" to "e" satisfy $0.85 \le a \le 1.2$, $0 < b < 0.5$, $0 \le c \le 0.5$, $(b+c) < 1$, $-0.1 \le d \le 0.2$, and $0 \le e \le 0.1$, it is to be noted that the composition of lithium varies depending on charge and discharge states, and "a" is a value in a completely-discharged state.

$$Li_aNi_{(1-b)}M12_bO_{(2-c)}F_d \quad (12)$$

where M12 is one or more of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.8 \le a \le 1.2$, $0.005 \le b \le 0.5$, $-0.1 \le c \le 0.2$, and $0 \le d \le 0.1$, it is to be noted that the composition of lithium varies depending on charge and discharge states, and "a" is a value in a completely-discharged state.

$$Li_aCo_{(1-b)}M13_bO_{(2-c)}F_d \quad (13)$$

where M13 is one or more of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.8 \leq a \leq 1.2$, $0 \leq b < 0.5$, $-0.1 \leq c \leq 0.2$, and $0 \leq d \leq 0.1$, it is to be noted that the composition of lithium varies depending on charge and discharge states, and "a" is a value in a completely-discharged state.

Specific but non-limiting examples of the lithium-containing composite oxide having the layered rock-salt crystal structure may include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})_2$.

It is to be noted that in a case where the lithium-containing composite oxide having the layered rock-salt crystal structure includes nickel, cobalt, manganese, and aluminum as constituent elements, an atomic ratio of nickel may be preferably 50 at % or more, which makes it possible to achieve high energy density.

Non-limiting examples of the lithium-containing composite oxide having the spinel crystal structure may include a compound represented by the following formula (14).

$$Li_a Mn_{(2-b)} M14_b O_c F_d \quad (14)$$

where M14 is one or more of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.9 \leq a \leq 1.1$, $0 \leq b \leq 0.6$, $3.7 \leq c \leq 4.1$, and $0 \leq d \leq 0.1$, it is to be noted that the composition of lithium varies depending on charge and discharge states, and "a" is a value in a completely-discharged state.

Specific but non-limiting examples of the lithium-containing composite oxide having the spinel crystal structure may include $LiMn_2O_4$.

Non-limiting examples of the lithium-containing phosphate compound having the olivine crystal structure may include a compound represented by the following formula (15).

$$Li_a M15 PO_4 \quad (15)$$

where M15 is one or more of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr), "a" satisfies $0.9 \leq a \leq 1.1$, it is to be noted that the composition of lithium varies depending on charge and discharge states, and "a" is a value in a completely-discharged state.

Specific but non-limiting examples of the lithium-containing phosphate compound having the olivine crystal structure may include $LiFePO_4$, $LiMnPO_4$, $LiFe_{0.5}Mn_{0.5}PO_4$, and $LiFe_{0.3}Mn_{0.7}PO_4$.

It is to be noted that the lithium-containing composite oxide may be, for example, a compound represented by the following formula (16).

$$(Li_2MnO_3)_x(LiMnO_2)_{1-x} \quad (16)$$

where "x" satisfies $0 \leq x \leq 1$, it is to be noted that the composition of lithium varies depending on charge and discharge states, and "x" is a value in a completely-discharged state.

(Other Cathode Materials)

Moreover, non-limiting examples of the cathode material may include an oxide, a disulfide, a chalcogenide, and a conductive polymer. Non-limiting examples of the oxide may include titanium oxide, vanadium oxide, and manganese dioxide. Non-limiting examples of the disulfide may include titanium disulfide and molybdenum sulfide. Non-limiting examples of the chalcogenide may include niobium selenide. Non-limiting examples of the conductive polymer may include sulfur, polyaniline, and polythiophene.

(Cathode Binder)

The cathode binder may include, for example, one or more of synthetic rubbers and polymer compounds. Non-limiting examples of the synthetic rubbers may include a styrene-butadiene-based rubber, a fluorine-based rubber, and ethylene propylene diene. Non-limiting examples of the polymer compounds may include polyvinylidene fluoride and polyimide.

(Cathode Conductor)

The cathode conductor may include, for example, one or more of conductive materials such as carbon materials. Non-limiting examples of the carbon materials may include graphite, carbon black, acetylene black, and Ketjen black. Alternatively, the cathode conductor may be any other material such as a metal material and a conductive polymer, as long as the cathode conductor is a material having conductivity.

[Anode]

The anode 20 includes an anode current collector 21 and a first anode active material layer 22 that is provided on the anode current collector 21. In other words, the first anode active material layer 22 is provided on one surface of the anode current collector 21. Note that the first anode active material layer 22 is disposed to face the cathode 10 (the first cathode active material layer 12).

(Anode Current Collector)

The anode current collector 21 may include, for example, one or more of conductive materials. The kind of the conductive material is not particularly limited, but may be, for example, a metal material such as copper, aluminum, nickel, and stainless steel. The anode current collector 21 may be configured of a single layer or may be configured of multiple layers.

A surface of the anode current collector 21 may be preferably roughened. This makes it possible to improve adhesibility of the first anode active material layer 22 with respect to the anode current collector 21 by a so-called anchor effect. In this case, it may be only necessary to roughen the surface of the anode current collector 21 at least in a region facing the first anode active material layers 22. Non-limiting examples of a roughening method may include a method of forming fine particles with use of electrolytic treatment. Through the electrolytic treatment, fine particles are formed on the surface of the anode current collector 21 in an electrolytic bath by an electrolytic method to make the surface of the anode current collector 21 rough. A copper foil fabricated by the electrolytic method is generally called "electrolytic copper foil".

(First Anode Active Material Layer)

The first anode active material layer 22 may include, as an anode active material, one or more of anode materials that have ability to insert and extract lithium. It is to be noted that the first anode active material layer 22 may further include one or more of other materials such as an anode binder and an anode conductor.

In order to prevent lithium from being unintentionally precipitated on the anode 20 in the middle of charge, chargeable capacity of the anode material may be preferably larger than discharge capacity of the cathode 10. In other words, electrochemical equivalent of the anode material that has ability to insert and extract lithium may be preferably larger than electrochemical equivalent of the cathode 10.
(Anode Material: Titanium-Containing Compound)

The anode material includes a titanium-containing compound. Since the titanium-containing compounds are electrochemically stable (have low reactivity), as compared with carbon materials, etc. to be described later, the titanium-containing compounds suppress decomposition reaction of the electrolytic solution resulting from reactivity of the anode 22. The kind of the titanium-containing compounds is not particularly limited; however, non-limiting examples of the titanium-containing compounds may include a titanium oxide, a lithium-titanium composite oxide, and a hydrogen-titanium compound.

The "titanium oxide" is a generic name of a compound of titanium (Ti) and oxygen (O). The "lithium-titanium composite oxide" is a generic name of an oxide including titanium, lithium, and one or more of other elements as constituent elements. Details of the other elements may be as described above, for example. The "hydrogen-titanium compound" is a generic name of a compound including hydrogen (H) and titanium as constituent elements. Note that the hydrogen-titanium compound described here is excluded from the foregoing lithium-titanium composite oxide.

Specifically, the titanium oxide may be, for example, a compound represented by the following formula (1). More specifically, non-limiting examples of the titanium oxide may include a bronze type titanium oxide.

$$TiO_w \tag{1}$$

where w satisfies $1.85 \leq w \leq 2.15$.

Specific but non-limiting examples of the titanium oxide may include an anatase type titanium oxide ($TiO_2$), a rutile type titanium oxide, and a brookite type titanium oxide.

Note that the titanium oxide may be a composite oxide including, together with titanium, one or more of elements such as phosphorus (P), vanadium (V), tin (Sn), copper (Cu), nickel (Ni), iron (Fe), and cobalt (Co). Specific but non-limiting examples of the composite oxide may include $TiO_2$—$P_2O_5$, $TiO_2$—$V_2O_5$, $TiO_2$—$P_2O_5$—$SnO_2$, and $TiO_2$—$P_2O_5$-MeO, where Me may be, for example, one or more of elements such as copper, nickel, iron, and cobalt.

A potential at which lithium is inserted in and extracted from these titanium oxides may be, for example, from 1 V to 2 V both inclusive (vs Li/Li$^+$).

Non-limiting examples of the lithium-titanium composite oxide may include respective compounds represented by the following formulas (2) to (4). More specifically, non-limiting examples of the lithium-titanium composite oxide may include a ramsdellite type lithium titanate. M1 in the formula (2) is a metal element that possibly becomes a divalent ion. M2 in the formula (3) is a metal element that possibly becomes a trivalent ion. M3 in the formula (4) is a metal element that possibly becomes a tetravalent ion.

$$Li[Li_xM1_{(1-3x)/2}Ti_{(3+x)/2}]O_4 \tag{2}$$

where M1 is one or more of magnesium (Mg), calcium (Ca), copper (Cu), zinc (Zn), and strontium (Sr), and "x" satisfies $0 \leq x \leq 1/3$.

$$Li[Li_yM2_{1-3y}Ti_{1+2y}]O_4 \tag{3}$$

where M2 is one or more of aluminum (Al), scandium (Sc), chromium (Cr), manganese (Mn), iron (Fe), germanium (Ge), gallium (Ga), and yttrium (Y), and "y" satisfies $0 \leq y \leq 1/3$.

$$Li[Li_{1/3}M3_zTi_{(5/3-z)}]O_4 \tag{4}$$

where M3 is one or more of vanadium (V), zirconium (Zr), and niobium (Nb), and "z" satisfies $0 \leq z \leq 2/3$.

The crystal structure of the lithium-titanium composite oxide is not particularly limited; however, in particular, the spinel type crystal structure may be preferable. The spinel type crystal structure is resistant to change during charge and discharge, which makes it possible to achieve stable battery characteristics.

Specific but non-limiting examples of the compound represented by the formula (2) may include $Li_{3.75}Ti_{4.875}Mg_{0.375}O_{12}$. Specific but non-limiting examples of the compound represented by the formula (3) may include $LiCrTiO_4$. Specific but non-limiting examples of the compound represented by the formula (4) may include $Li_4Ti_5O_{12}$ and $Li_4Ti_{4.95}Nb_{0.05}O_{12}$.

Specific but non-limiting examples of the hydrogen-titanium compound may include $H_2Ti_3O_7(3TiO_2.1H_2O)$, $H_6Ti_{12}O_{27}(3TiO_2.0.75H_2O)$, $H_2Ti_6O_{13}(3TiO_2.0.5H_2O)$, $H_2Ti_7O_{15}(3TiO_2.0.43H_2O)$, and $H_2Ti_{12}O_{25}(3TiO_2.0.25H_2O)$.

It goes without saying that two or more of the titanium oxide, the lithium-titanium composite oxide, and the hydrogen-titanium compound may be used in combination.
(Other Anode Materials)

It is to be noted that the anode material may include one or more of other anode materials together with the foregoing titanium-containing compound. The kind of the other anode materials is not particularly limited; however, non-liming examples of the other anode materials may include a carbon material and a metal-based material.
(Carbon Material)

The "carbon material" is a generic name of a material including carbon as a constituent element. The carbon material causes an extremely-small change in a crystal structure thereof during insertion and extraction of lithium, which stably achieves high energy density. Further, the carbon material also serves as the anode conductor, which improves conductivity of the first anode active material layer 22.

Non-limiting examples of the carbon material may include graphitizable carbon, nongraphitizable carbon, and graphite. A spacing of (002) plane in the nongraphitizable carbon may be preferably 0.37 nm or larger, and a spacing of (002) plane in the graphite may be preferably 0.34 nm or smaller. More specific examples of the carbon material may include pyrolytic carbons, cokes, glassy carbon fibers, an organic polymer compound fired body, activated carbon, and carbon blacks. Non-limiting examples of the cokes may include pitch coke, needle coke, and petroleum coke. The organic polymer compound fired body is a polymer compound fired (carbonized) at an appropriate temperature. Non-limiting examples of the polymer compound may include phenol resin and furan resin. Other than the materials mentioned above, the carbon material may be low crystalline carbon that is subjected to heat treatment at a temperature of about 1000° C. or lower, or may be amorphous carbon. It is to be noted that a shape of the carbon material may be one or more of a fibrous shape, a spherical shape, a granular shape, and a scale-like shape.
(Metal-Based Material)

The "metal-based material" is a generic name of a material including one or more of metal elements and metalloid elements as constituent elements, and the metal-based material achieves high energy density. However, the foregoing lithium-containing compound is excluded from the metal-based material described here.

The metal-based material may be any of a simple substance, an alloy, or a compound, may be two or more thereof, or may have one or more phases thereof at least in part. The simple substance described here merely refers to a simple substance in a general sense, and may include a small amount of impurity. In other words, purity of the simple substance is not necessarily limited to 100%. Moreover, the alloy may be a material configured of two or more metal elements, a material including one or more metal elements and one or more metalloid elements, and the alloy may include one or more of nonmetallic elements. Non-limiting examples of a structure of the metal-based material may include a solid solution, a eutectic crystal (a eutectic mixture), an intermetallic compound, and a structure in which two or more thereof coexist.

The metal elements may be, for example, metal elements that are able to form an alloy with lithium, and the metalloid elements may be, for example, metalloid elements that are able to form an alloy with lithium. Specific but non-limiting examples of the metal elements and the metalloid elements may include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

In particular, silicon, tin, or both may be preferable. Silicon and tin have superior ability to insert and extract lithium, and achieve remarkably high energy density accordingly.

A material that includes silicon, tin, or both as constituent elements may be any of a simple substance, an alloy, and a compound of silicon, may be any of a simple substance, an alloy, and a compound of tin, may be two or more thereof, or may be a material that has one or more phases thereof at least in part. Each of the simple substance and the alloy are defined as described above.

The alloy of silicon may include, for example, one or more of elements such as tin, nickel, copper, iron, cobalt, manganese, zinc, indium, silver, titanium, germanium, bismuth, antimony, and chromium, as constituent elements other than silicon. The compound of silicon may include, for example, one or more of elements such as carbon and oxygen, as constituent elements other than silicon. It is to be noted that the compound of silicon may include, for example, one or more of the elements described related to the alloy of silicon, as constituent elements other than silicon.

Specific but non-limiting examples of the alloy of silicon and the compound of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), and LiSiO. It is to be noted that "v" in $SiO_v$ may be, for example, within a range of $0.2<v<1.4$.

The alloy of tin may include, for example, one or more of elements such as silicon, nickel, copper, iron, cobalt, manganese, zinc, indium, silver, titanium, germanium, bismuth, antimony, and chromium, as constituent elements other than tin. The compound of tin may include, for example, one or more of elements such as carbon and oxygen, as constituent elements other than tin. It is to be noted that the compound of tin may include, for example, one or more of the elements described related to the alloy of tin, as constituent elements other than tin.

Specific but non-limiting examples of the alloy of tin and the compound of tin may include $SnO_w$ ($0<w\leq2$), $SnSiO_3$, LiSnO, and $Mg_2Sn$.

In particular, the material that includes tin as a constituent element may be preferably, for example, a tin-containing material that includes, together with tin as a first constituent element, a second constituent element and a third constituent element. The second constituent element may include, for example, one or more of elements such as cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, and silicon. The third constituent element may include, for example, one or more of elements such as boron, carbon, aluminum, and phosphorus. The tin-containing material including the second constituent element and the third constituent element makes it possible to achieve, for example, high battery capacity and superior cycle characteristics.

In particular, the tin-containing material may be preferably a tin-cobalt-carbon-containing material that includes tin, cobalt, and carbon as constituent elements. In the tin-cobalt-carbon-containing material, for example, a content of carbon may be from 9.9 mass % to 29.7 mass % both inclusive, and a ratio of contents of tin and cobalt (Co/(Sn+Co)) may be from 20 mass % to 70 mass % both inclusive. This makes it possible to achieve high energy density.

The tin-cobalt-carbon-containing material may have a phase that includes tin, cobalt, and carbon. Such a phase may be preferably low crystalline or amorphous. This phase is a phase (a reaction phase) that is able to react with lithium. Hence, existence of the reaction phase results in achievement of superior characteristics. A half width (a diffraction angle 2θ) of a diffraction peak obtained by X-ray diffraction of this reaction phase may be preferably 1° or larger in a case where a CuKα ray is used as a specific X-ray, and an insertion rate is 1°/min. This makes it possible to insert and extract lithium more smoothly, and to decrease reactivity with the electrolytic solution. It is to be noted that, in some cases, the tin-cobalt-carbon-containing material may include a phase that includes simple substances of the respective constituent elements or part thereof in addition to the low-crystalline phase or the amorphous phase.

Comparison between X-ray diffraction charts before and after an electrochemical reaction with lithium makes it possible to easily determine whether the diffraction peak obtained by the X-ray diffraction corresponds to the reaction phase that is able to react with lithium. For example, if a position of the diffraction peak after the electrochemical reaction with lithium is changed from the position of the diffraction peak before the electrochemical reaction with lithium, the obtained diffraction peak corresponds to the reaction phase that is able to react with lithium. In this case, for example, the diffraction peak of the low-crystalline reaction phase or the amorphous reaction phase may be seen within a range of 2θ that is from 20° to 50° both inclusive. Such a reaction phase may include, for example, the respective constituent elements mentioned above, and it may be considered that such a reaction phase has become low crystalline or amorphous mainly because of existence of carbon.

In the tin-cobalt-carbon-containing material, part or all of carbon that is the constituent element thereof may be preferably bound to one or both of a metal element and a metalloid element that are other constituent elements thereof. Binding part or all of carbon suppresses cohesion or crystallization of, for example, tin. It is possible to confirm a binding state of the elements, for example, by X-ray photoelectron spectroscopy (XPS). In a commercially-available apparatus, for example, an Al-Kα ray or a Mg-Kα ray may be used as a soft X-ray. In a case where part or all of carbon is bound to one or both of the metal element and the metalloid element, a peak of a synthetic wave of is orbit of carbon (C1s) appears in an energy region lower than 284.5 eV. It is to be noted that energy calibration is so made that a peak of 4f orbit of a gold atom (Au4f) is obtained at 84.0 eV. In this case, in general, surface contamination carbon exists on the material surface. Hence, a peak of C1s of the surface contamination carbon is regarded to be at 284.8 eV, and this peak is used as energy standard. In XPS measurement, a waveform of the peak of C1s is obtained as a form that includes the peak of the surface contamination carbon and the peak of the carbon in the tin-cobalt-carbon-containing material. The two peaks may be therefore separated from each other, for example, by analysis with use of commercially-available software. In the analysis of the waveform, a position of the main peak that exists on the lowest bound energy side is regarded as the energy standard (284.8 eV).

The tin-cobalt-carbon-containing material is not limited to a material that includes only tin, cobalt, and carbon as constituent elements. The tin-cobalt-carbon-containing material may further include one or more of elements such as silicon, iron, nickel, chromium, indium, niobium, germanium, titanium, molybdenum, aluminum, phosphorus, gallium, and bismuth, as constituent elements, in addition to tin, cobalt, and carbon.

Other than the tin-cobalt-carbon-containing material, a tin-cobalt-iron-carbon-containing material that includes tin, cobalt, iron, and carbon as constituent elements may be also preferable. Any composition of the tin-cobalt-iron-carbon-containing material may be adopted. To give an example, in a case where a content of iron is set smaller, a content of carbon may be from 9.9 mass % to 29.7 mass % both inclusive, a content of iron may be from 0.3 mass % to 5.9 mass % both inclusive, and a ratio of contents of tin and cobalt (Co/(Sn+Co)) may be from 30 mass % to 70 mass % both inclusive. Alternatively, in a case where the content of iron is set larger, the content of carbon may be from 11.9 mass % to 29.7 mass % both inclusive, the ratio of contents of tin, cobalt, and iron ((Co+Fe)/(Sn+Co+Fe)) may be from 26.4 mass % to 48.5 mass % both inclusive, and the ratio of contents of cobalt and iron (Co/(Co+Fe)) may be from 9.9 mass % to 79.5 mass % both inclusive. Such composition ranges allow for achievement of high energy density. It is to be noted that physical properties (such as a half width) of the tin-cobalt-iron-carbon-containing material are similar to physical properties of the foregoing tin-cobalt-carbon-containing material.

Other than the materials mentioned above, non-limiting examples of the other anode materials may include a metal oxide and a polymer compound. Non-limiting examples of the metal oxide may include iron oxide, ruthenium oxide, and molybdenum oxide. Non-limiting examples of the polymer compound may include polyacetylene, polyaniline, and polypyrrole.

In the secondary battery, as described above, in order to prevent lithium metal from being unintentionally precipitated on a surface of the anode 20 in the middle of charge, the electrochemical equivalent of the anode material that has ability to insert and extract lithium may be preferably larger than the electrochemical equivalent of the cathode. In a case where an open circuit voltage (that is, a battery voltage) in a completely-charged state is 4.25 V or higher, an extraction amount of lithium per unit mass is larger than that in a case where the open circuit voltage is 4.20 V, even if the same cathode active material is used. Hence, amounts of the cathode active material and the anode active material are adjusted in accordance therewith. As a result, high energy density is achieved.

(Anode Binder and Anode Conductor)

Details of the anode binder may be similar to, for example, details of the foregoing cathode binder. Moreover, details of the anode conductor may be similar to, for example, details of the foregoing cathode conductor.

[Intermediate Electrode]

The intermediate electrode 30 includes an intermediate current collector 31, a second anode active material layer 32, and a second cathode active material layer 33. The second anode active material layer 32 and the second cathode active material layer 33 are provided on the intermediate current collector 31. In other words, the second anode active material layer 32 is provided on one surface of the intermediate current collector 31, and the second cathode active material layer 33 is provided on the other surface of the intermediate current collector 31.

Note that the second anode active material layer 32 is disposed to face the cathode 10 (the first cathode active material layer 12), and the second cathode active material layer 33 is disposed to face the anode 20 (the first anode active material layer 22).

The intermediate electrode 30 is a bipolar electrode including the second anode active material layer 32 serving as the anode 20 and the second cathode active material layer 33 serving as the cathode 10.

(Intermediate Current Collector)

The intermediate current collector 31 may include, for example, one or more of conductive materials. The kind of the conductive material is not particularly limited; however, the kind of the conductive material may be similar to, for example, a formation material of the cathode current collector 11 or a formation material of the anode current collector 21. The intermediate current collector 31 may be configured of a single layer or may be configured of multiple layers.

In a case where the kind of the conductive material is slimier to the formation material of the anode current collector 21, a surface of the intermediate current collector 31 may be roughened similarly to the surface of the anode current collector 21.

(Second Anode Active Material Layer)

The second anode active material layer 32 may have a configuration similar to the configuration of the foregoing first anode active material layer 22. In other words, the second anode active material layer 32 may include, as an anode active material, one or more of the anode materials that have ability to insert and extract lithium, and may further include one or more of other materials such as the anode binder and the anode conductor. The anode material includes the titanium-containing compound.

(Second Cathode Active Material Layer)

The second cathode active material layer 33 may have a configuration similar to the configuration of the foregoing first cathode active material layer 12. In other words, the second cathode active material layer 33 may include, as a cathode active material, one or more of the cathode materials that have ability to insert and extract lithium, and may further include one or more of other materials such as the cathode binder and the cathode conductor.

[Separator]

The separator 40 may be provided, for example, between the cathode 10 and the intermediate electrode 30, as described above. The separator 40 passes lithium ions therethrough while preventing current short circuit that results from contact between the cathode 10 and the intermediate electrode 30. Moreover, the separator 40 may be provided, for example, between the anode 20 and the intermediate electrode 30, as described above. The separator 40 passes lithium ions therethrough while preventing current short circuit that results from contact between the anode 20 and the intermediate electrode 30.

Specifically, the separator 40 may include, for example, one or more of porous films such as porous films of a synthetic resin, a natural resin, and ceramics. The separator 40 may be a laminated film in which two or more porous films are laminated. Non-limiting examples of the synthetic resin may include polytetrafluoroethylene, polypropylene, and polyethylene. Non-limiting examples of the natural resin may include cellulose.

In particular, in a case where the cathode 10 (the cathode active material) includes lithium-containing phosphate compound, the separator 40 may preferably include cellulose. In a case where the anode 20 (the anode active material) includes the titanium-containing compound and the cathode 10 includes the lithium-containing phosphate compound, thermal stability of both the titanium-containing compound and the lithium-containing phosphate compound causes the secondary battery to become resistant to thermal runaway. This makes it possible to use, as a formation material of the separator 40, cellulose having extremely high porosity while assuring safety of the secondary battery, thereby facilitating smooth and safe movement of lithium ions through the separator 40.

It is to be noted that the separator 40 may include, for example, the foregoing porous film (a base layer) and a polymer compound layer provided on a single surface or both surfaces of the base layer. This makes it possible to improve adhesibility of the separator 23 with respect to each of the cathode 10, the anode 20, and the intermediate electrode 30, thereby suppressing deformation of the entire secondary battery. This makes it possible to suppress decomposition reaction of the electrolytic solution and to suppress liquid leakage of the electrolytic solution with which the base layer is impregnated. Accordingly, even if charge and discharge are repeated, electrical resistance is less prone to increase, and the secondary battery is less prone to swell.

The polymer compound layer may include, for example, a polymer compound such as polyvinylidene fluoride, which has high physical strength and is electrochemically stable. Note that the kind of the polymer compound is not limited to polyvinylidene fluoride. In order to form the polymer compound layer, for example, the base layer may be coated with a solution prepared by dissolving the polymer compound in, for example, an organic solvent, and thereafter, the base layer may be dried. Alternatively, the base layer may be immersed in the solution, and thereafter the base layer may be dried.

The polymer compound layer may include, for example, one or more of insulating particles such as inorganic particles. This causes the separator 40 to become resistant to oxidation, thereby making short circuit less prone to occur. This makes it possible to improve safety of the secondary battery. The kind of the inorganic particles may be, for example, aluminum oxide and aluminum nitride.

[Electrolytic Solution]

The electrolytic solution may include one or more of solvents and one or more of electrolyte salts. More specifically, the electrolytic solution may include one of the solvents and one of the electrolyte salts, may include one of the solvents and two or more of the electrolyte salts, may include two or more of the solvents and one of the electrolyte salts, or may include two or more of the solvents and two or more of the electrolyte salts. Note that the electrolytic solution may further include one or more of other materials such as an additive.

(Solvents)

The solvents may include, for example, one or more of nonaqueous solvents (organic solvents). An electrolytic solution including the nonaqueous solvent is a so-called nonaqueous electrolytic solution.

Non-limiting examples of the nonaqueous solvent may include a cyclic carbonate ester, a chain carbonate ester, a lactone, a chain carboxylate ester, and a nitrile (mononitrile), which make it possible to achieve, for example, high battery capacity, superior cycle characteristics, and superior storage characteristics.

Specific but non-limiting examples of the cyclic carbonate ester may include ethylene carbonate, propylene carbonate, and butylene carbonate. Specific but non-limiting examples of the chain carbonate ester may include dimethyl carbonate, diethyl carbonate, ethyl methyl carbonate, and methylpropyl carbonate. Specific but non-limiting examples of the lactone may include γ-butyrolactone and γ-valerolactone. Specific but non-limiting examples of the chain carboxylate ester may include methyl acetate, ethyl acetate, methyl propionate, ethyl propionate, propyl propionate, methyl butyrate, methyl isobutyrate, methyl trimethylacetate, and ethyl trimethylacetate. Specific but non-limiting examples of the nitrile may include acetonitrile, methoxyacetonitrile, and 3-methoxypropionitrile.

Other than the materials mentioned above, non-limiting examples of the nonaqueous solvent may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethylsulfoxide. These solvents make it possible to achieve similar advantages.

Moreover, non-limiting examples of the nonaqueous solvent may include an unsaturated cyclic carbonate ester, a halogenated carbonate ester, a sulfonate ester, an acid anhydride, a dinitrile compound, a diisocyanate compound, and a phosphate ester, which make it possible to further improve chemical stability of the electrolytic solution.

The "unsaturated cyclic carbonate ester" is a generic name of a cyclic carbonate ester having one or more unsaturated carbon-carbon bonds (carbon-carbon double bonds). Specific but non-limiting examples of the unsaturated cyclic carbonate esters may include respective compounds represented by the following formulas (21) to (23). A content of the unsaturated cyclic carbonate ester in the nonaqueous solvent is not particularly limited, but may be, for example, from 0.01 wt % to 10 wt % both inclusive.

[Chem. 1]

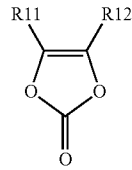

(21)

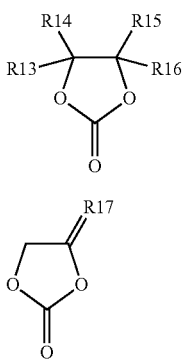
(22)

(23)

where each of R11 and R12 is one of a hydrogen group and an alkyl group, each of R13 to R16 is one of a hydrogen group, an alkyl group, a vinyl group, and an allyl group, one or more of R13 to R16 are one of the vinyl group and the allyl group, R17 is a group represented by >CR171R172, and each of R171 and R172 is one of a hydrogen group and an alkyl group.

The compound represented by the formula (21) is a vinylene carbonate-based compound. Each of R11 and R12 is not particularly limited, as long as each of R11 and R12 is one of the hydrogen group and the alkyl group, as described above. The number of carbons in the alkyl group is not particularly limited. Specific but non-limiting examples of the alkyl group may include a methyl group, an ethyl group, and a propyl group. R11 and R12 may be groups of a same kind or groups of different kinds. R11 and R12 may be bound to each other.

Specific but non-limiting examples of the vinylene carbonate-based compound may include vinylene carbonate (1,3-dioxol-2-one), methylvinylene carbonate (4-methyl-1,3-dioxol-2-one), ethylvinylene carbonate (4-ethyl-1,3-dioxol-2-one), 4,5-dimethyl-1,3-dioxol-2-one, and 4,5-diethyl-1,3-dioxol-2-one.

The compound represented by the formula (22) is a vinyl ethylene carbonate-based compound. Each of R13 to R16 is not particularly limited, as long as each of R13 to R16 is one of the hydrogen group, the alkyl group, the vinyl group, and the allyl group, as described above, on condition that one or more of R13 to R16 are one of the vinyl group and the allyl group. Details of the alkyl group are as described above. It is to be noted that R13 to R16 may be groups of a same kind or groups of different kinds. It goes without saying that some of R13 to R16 may be groups of a same kind. Two or more of R13 to R16 may be bound to each other.

Specific but non-limiting examples of the vinyl ethylene carbonate-based compound may include vinyl ethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one.

The compound represented by the formula (23) is a methylene ethylene carbonate-based compound. Each of R171 and R172 is not particularly limited, as long as each of R171 and R172 is one of the hydrogen group and the alkyl group, as described above. It is to be noted that R171 and R172 may be groups of a same kind or groups of different kinds. R171 and R172 may be bound to each other.

Specific but non-limiting examples of the methylene ethylene carbonate-based compound may include methylene ethylene carbonate (4-methylene-1,3-dioxolane-2-one), 4,4-dimethyl-5-methylene-1,3-dioxolane-2-one, and 4,4-diethyl-5-methylene-1,3-dioxolane-2-one.

In addition, non-limiting examples of the unsaturated cyclic carbonate ester may include a catechol carbonate having a benzene ring.

The "halogenated carbonate ester" is a generic name of a cyclic or chain carbonate ester including one or more halogen elements as constituent elements. Specific but non-limiting examples of the halogenated carbonate ester may include respective compounds represented by the following formulas (24) and (25). A content of the halogenated carbonate ester in the nonaqueous solvent is not particularly limited, but may be, for example, from 0.01 wt % to 10 wt % both inclusive.

[Chem. 2]

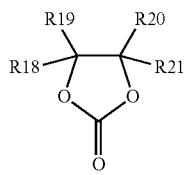
(24)

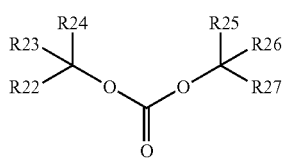
(25)

where each of R18 to R21 is one of a hydrogen group, a halogen group, an alkyl group, and a halogenated alkyl group, one or more of R18 to R21 are one of the halogen group and the halogenated alkyl group, each of R22 to R27 is one of a hydrogen group, a halogen group, an alkyl group, and a halogenated alkyl group, and one or more of R22 to R27 are one of the halogen group and the halogenated alkyl group.

The compound represented by the formula (24) is a halogenated cyclic carbonate ester. Each of R18 to R21 is not particularly limited, as long as each of R18 to R21 is one of the hydrogen group, the halogen group, the alkyl group, and the halogenated alkyl group, as described above, under a condition that one or more of R18 to R21 is one of the halogen group and the halogenated alkyl group. It is to be noted that R18 to R21 may be groups of a same kind or groups of different kinds. It goes without saying that some of R18 to R21 may be groups of a same kind. Two or more of R18 to R21 may be bound to each other.

Non-limiting examples of the halogen group may include a fluorine group, a chlorine group, a bromine group, and a iodine group, and the fluorine group may be particularly preferable. The number of the halogen groups may be one or more, and one or more kinds of the halogen groups may be adapted. Details of the alkyl group are as described above. The "halogenated alkyl group" is a generic name of a group in which one or more hydrogen groups in an alkyl group are substituted (halogenated) by a halogen group, and details of the halogen group are as described above.

Specific but non-limiting examples of the halogenated cyclic carbonate ester may include respective compounds represented by the following formulas (24-1) to (24-21), which include geometric isomers. In particular, for example, 4-fluoro-1,3-dioxolane-2-one represented by the formula (24-1) and 4,5-difluoro-1,3-dioxolane-2-one represented by the formula (24-3) may be preferable.
[Chem. 3]
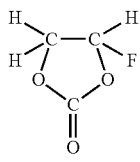 (24-1)
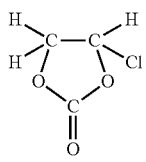 (24-2)
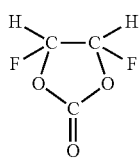 (24-3)
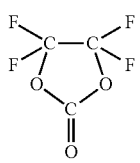 (24-4)
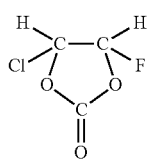 (24-5)
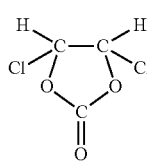 (24-6)
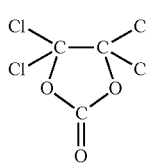 (24-7)
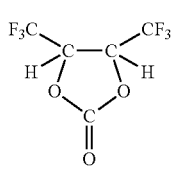 (24-8)
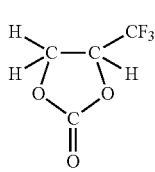 (24-9)
-continued
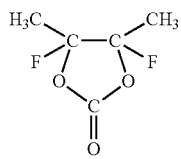 (24-10)
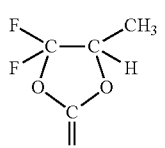 (24-11)
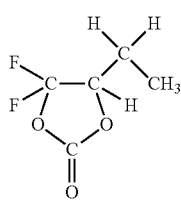 (24-12)
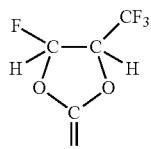 (24-13)
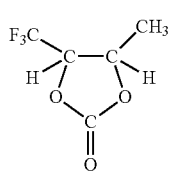 (24-14)
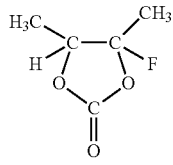 (24-15)
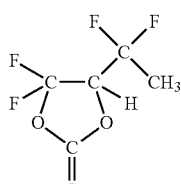 (24-16)
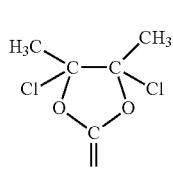 (24-17)
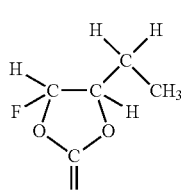 (24-18)

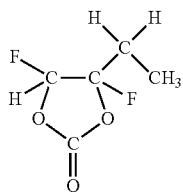
(24-19)

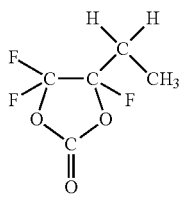
(24-20)

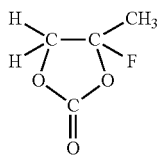
(24-21)

[Chem. 4]

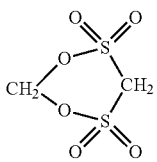
(26-1)

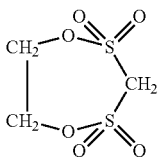
(26-2)

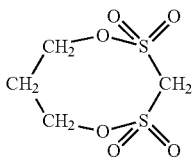
(26-3)

The compound represented by the formula (25) is a halogenated chain carbonate ester. Each of R22 to R27 is not particularly limited, as long as each of R22 to R27 is one of the hydrogen group, the halogen group, the alkyl group, and the halogenated alkyl group, as described above, under a condition that one or more of R22 to R27 is one of the halogen group and the halogenated alkyl group. Details of the halogen group, the alkyl group, and the halogenated alkyl group are as described above. It is to be noted that R22 to R27 may be groups of a same kind or groups of different kinds. It goes without saying that some of R22 to R27 may be groups of a same kind. Two or more of R22 to R27 may be bound to each other.

Specific but non-limiting examples of the halogenated chain carbonate ester may include fluoromethyl methyl carbonate, bis(fluoromethyl) carbonate, and difluoromethyl methyl carbonate.

Non-limiting examples of the sulfonate ester may include a monosulfonate ester and a disulfonate ester. A content of the sulfonate ester in the nonaqueous solvent is not particularly limited, but may be, for example, from 0.01 wt % to 10 wt % both inclusive.

The monosulfonate ester may be a cyclic monosulfonate ester or a chain monosulfonate ester. Specific but non-limiting examples of the cyclic monosulfonate ester may include sultone such as 1,3-propane sultone and 1,3-propene sultone. Specific but non-limiting examples of the chain monosulfonate ester may include a compound in which a cyclic monosulfonate ester is cleaved at a middle site.

The disulfonate ester may be a cyclic disulfonate ester or a chain disulfonate ester. Specific but non-limiting examples of the cyclic disulfonate ester may include respective compounds represented by formulas (26-1) to (26-3). Specific but non-limiting examples of the chain disulfonate ester may include a compound in which a cyclic disulfonate ester is cleaved at a middle site.

Non-limiting examples of the acid anhydride may include a carboxylic anhydride, a disulfonic anhydride, and a carboxylic-sulfonic anhydride. A content of the acid anhydride in the nonaqueous solvent is not particularly limited, but may be, for example, from 0.01 wt % to 10 wt % both inclusive.

Specific but non-limiting examples of the carboxylic anhydride may include succinic anhydride, glutaric anhydride, and maleic anhydride. Specific but non-limiting examples of the disulfonic anhydride may include ethanedisulfonic anhydride and propanedisulfonic anhydride. Specific but non-limiting examples of a carboxylic-sulfonic anhydride may include sulfobenzoic anhydride, sulfopropionic anhydride, and sulfobutyric anhydride.

Specific but non-limiting examples of the dinitrile compound may include a compound represented by NC-R28-CN, where R28 is one of an alkylene group and an arylene group. A content of the dinitrile compound in the nonaqueous solvent is not particularly limited, but may be, for example, from 0.5 wt % to 5 wt % both inclusive.

Non-limiting examples of the alkylene group may include a methylene group, an ethylene group, and a propylene group, and non-limiting examples of the arylene group may include a phenylene group and a naphthylene group. The number of carbons in the alkylene group is not particularly limited, but may be, for example, from 1 to 18, and the number of carbons in the arylene group is not particularly limited, but may be, for example, from 6 to 18.

Specific but non-limiting examples of the dinitrile compound may include succinonitrile (NC—$C_2H_4$—CN), glutaronitrile (NC—$C_3H_6$—CN), adiponitrile (NC—$C_4H_8$—CN), sebaconitrile (NC—$C_8H_{10}$—CN), and phthalonitrile (NC—$C_6H_4$—CN).

Non-limiting examples of the diisocyanate compound may include a compound represented by OCN-R29-NCO, where R29 is one of an alkylene group and an arylene group. Details of each of the alkylene group and the arylene group may be, for example, as described above. A content of the diisocyanate compound in the nonaqueous solvent is not particularly limited, but may be, for example, from 0.1 wt % to 10 wt % both inclusive. Specific but non-limiting examples of the diisocyanate compound may include OCN—$C_6H_{12}$—NCO.

Specific but non-limiting examples of the phosphate ester may include trimethyl phosphate, triethyl phosphate, and trialllyl phosphate. It is to be noted that a content of the phosphate ester in the nonaqueous solvent is not particularly limited, but may be, for example, from 0.5 wt % to 5 wt % both inclusive.

(Electrolyte Salt)

The electrolyte salt may include, for example, one or more of lithium salts. However, the electrolyte salt may include a salt other than the lithium salt. Non-limiting examples of the salt other than lithium may include a salt of a light metal other than lithium.

Specific but non-limiting examples of the lithium salt may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr).

In particular, one or more of lithium hexafluorophosphate, lithium tetrafluoroborate, lithium perchlorate, and lithium hexafluoroarsenate may be preferable, and lithium hexafluorophosphate may be more preferable. These lithium salts make it possible to decrease internal resistance.

Moreover, non-limiting examples of the electrolyte salt may include respective compounds represented by the following formulas (27) to (29). It is to be noted that R41 and R43 may be groups of a same kind or groups of different kinds. R51 to R53 may be groups of a same kind or groups of different kinds. It goes without saying that some of R51 to R53 may be groups of a same kind. R61 and R62 may be groups of a same kind or groups of different kinds.

[Chem. 5]

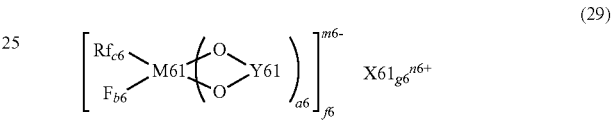

(27)

where X41 is one of Group 1 elements and Group 2 elements in the long form of the periodic table of the elements and aluminum (Al), M41 is one of transition metals, and Group 13 elements, Group 14 elements, and Group 15 elements in the long form of the periodic table of the elements, R41 is a halogen group, Y41 is one of —C(=O)—R42-C(=O)—, —C(=O)—CR43$_2$-, and —C(=O)—C(=O)—, R42 is one of an alkylene group, a halogenated alkylene group, an arylene group, and a halogenated arylene group, R43 is one of an alkyl group, a halogenated alkyl group, an aryl group, and a halogenated aryl group, a4 is an integer of 1 to 4, b4 is an integer of 0, 2, or 4, and each of c4, d4, m4, and n4 is an integer of 1 to 3.

[Chem. 6]

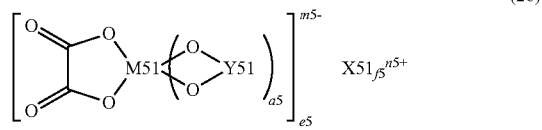

(28)

where X51 is one of Group 1 elements and Group 2 elements in the long form of the periodic table of the elements, M51 is one of transition metals, and Group 13 elements, Group 14 elements, and Group 15 elements in the long form of the periodic table of the elements, Y51 is one of —C(=O)—(CR51$_2$)$_{b5}$—C(=O)—, —R53$_2$C—(CR52$_2$)$_{c5}$—C(=O)—, —R53$_2$C—(CR52$_2$)$_{c5}$—CR53$_2$—, —R53$_2$C—(CR52$_2$)$_{c5}$—S(=O)$_2$—, —S(=O)$_2$—(CR52$_2$)$_{d5}$—S(=O)$_2$—, and —C(=O)—(CR52$_2$)$_{d5}$—S(=O)$_2$—, each of R51 and R53 is one of a hydrogen group, an alkyl group, a halogen group, and a halogenated alkyl group, one or more of R51's are one of the halogen group and the halogenated alkyl group, one or more of R53's are one of the halogen group and the halogenated alkyl group, R52 is one of a hydrogen group, an alkyl group, a halogen group, and a halogenated alkyl group, each of a5, e5, and n5 is an integer of 1 or 2, each of b5 and d5 is an integer of 1 to 4, c5 is an integer of 0 to 4, and each of f5 and m5 is an integer of 1 to 3.

[Chem. 7]

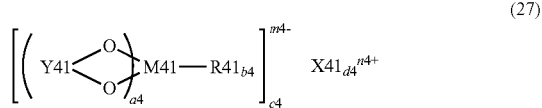

(29)

where X61 is one of Group 1 elements and Group 2 elements in the long form of the periodic table of the elements, M61 is one of transition metals, and Group 13 elements, Group 14 elements, and Group 15 elements in the long form of the periodic table of the elements, Rf is one of a fluorinated alkyl group and a fluorinated aryl group, the number of carbons in each of the fluorinated alkyl group and the fluorinated aryl group is from 1 to 10, Y61 is one of —C(=O)—(CR61$_2$)$_{d6}$—C(=O)—, —R62$_2$C—(CR61$_2$)$_{d6}$—C(=O)—, —R62$_2$C—(CR61$_2$)$_{d6}$—CR62$_2$—, —R62$_2$C—(CR61$_2$)$_{d6}$—S(=O)$_2$-, —S(=O)$_2$—(CR61$_2$)$_{e6}$—S(=O)$_2$-, and —C(=O)—(CR61$_2$)$_{e6}$—S(=O)$_2$-, R61 is one of a hydrogen group, an alkyl group, a halogen group, and a halogenated alkyl group, R62 is one of a hydrogen group, an alkyl group, a halogen group, and a halogenated alkyl group, one or more of R62's are one of the halogen group and the halogenated alkyl group, each of a6, f6, and n6 is an integer of 1 or 2, each of b6, c6, and e6 is an integer of 1 to 4, d6 is an integer of 0 to 4, and each of g6 and m6 is an integer of 1 to 3.

It is to be noted that the Group 1 elements include hydrogen (H), lithium (Li), sodium (Na), potassium (K), rubidium (Rb), cesium (Cs), and francium (Fr). The Group 2 elements include beryllium (Be), magnesium (Mg), calcium (Ca), strontium (Sr), barium (Ba), and radium (Ra). The Group 13 elements include boron (B), aluminum (Al), gallium (Ga), indium (In), and thallium (Tl). The Group 14 elements include carbon (C), silicon (Si), germanium (Ge), tin (Sn), and lead (Pb). The Group 15 elements include nitrogen (N), phosphorus (P), arsenic (As), antimony (Sb), and bismuth (Bi).

Specific but non-limiting examples of the compound represented by the formula (27) may include respective compounds represented by the following formulas (27-1) to (27-6). Specific but non-limiting examples of the compound represented by the formula (28) may include respective compounds represented by the following formulas (28-1) to (28-8). Specific but non-limiting examples of the compound represented by the formula (29) may include a compound represented by the following formula (29-1).

[Chem. 8]

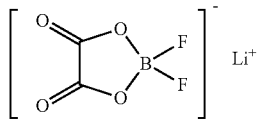
(27-1)

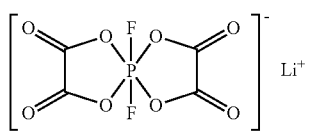
(27-2)

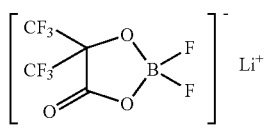
(27-3)

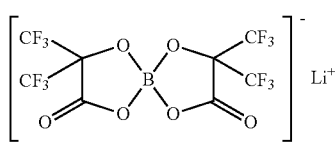
(27-4)

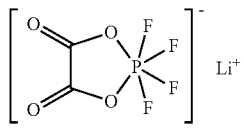
(27-5)

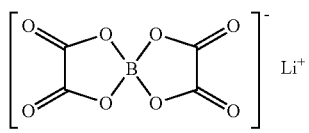
(27-6)

[Chem. 9]

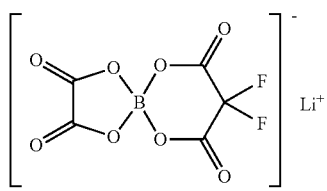
(28-1)

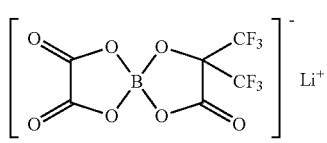
(28-2)

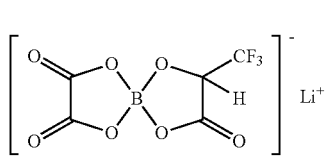
(28-3)

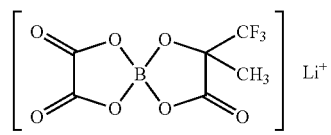
(28-4)

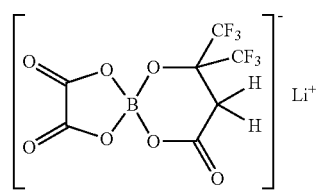
(28-5)

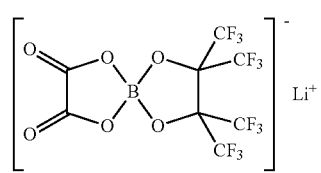
(28-6)

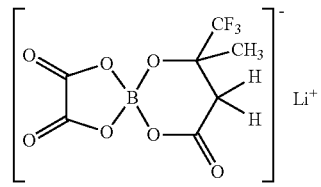
(28-7)

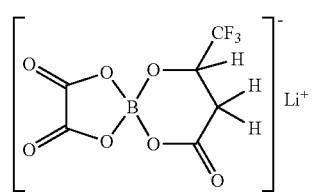
(28-8)

[Chem. 10]

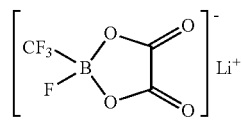
(29-1)

Moreover, the electrolyte salt may be, for example, respective compounds represented by the following formulas (30) to (32). Values of m and n may be the same as or different from each other. Values of p, q, and r may be the same as or different from one another. It goes without saying that the values of two of p, q, and r may be the same as each other.

$$LiN(C_mF_{2m+1}SO_2)(C_nF_{2n+1}SO_2) \quad (30)$$

where each of m and n is an integer of 1 or more.

[Chem. 11]

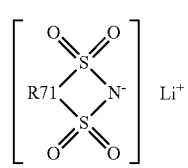
(31)

where R71 is a straight-chain perfluoroalkylene group having 2 to 4 carbons or a branched perfluoroalkylene group having 2 to 4 carbons.

$$\text{LiC}(C_pF_{2p+1}SO_2)(C_qF_{2q+1}SO_2)(C_rF_{2r+1}SO_2) \tag{32}$$

where each of p, q, and r is an integer of 1 or more.

The compound represented by the formula (30) is a chain amide compound. Specific but non-limiting examples of the chain amide compound may include lithium bis(fluorosulfonyl)amide (LiN(SO$_2$F)$_2$), lithium bis(trifluoromethanesulfonyl)amide (LiN(CF$_3$SO$_2$)$_2$), lithium bis(pentafluoroethanesulfonyl)amide (LiN(C$_2$F$_5$SO$_2$)$_2$), lithium (trifluoromethanesulfonyl)(pentafluoroethanesulfonyl)amide (LiN(CF$_3$SO$_2$)(C$_2$F$_5$SO$_2$)), lithium (trifluoromethanesulfonyl)(heptafluoropropanesulfonyl)amide (LiN(CF$_3$SO$_2$)(C$_3$F$_7$SO$_2$)), and lithium (trifluoromethanesulfonyl)(nonafluorobutanesulfonyl)amide (LiN(CF$_3$SO$_2$)(C$_4$F$_9$SO$_2$)).

The compound represented by the formula (31) is a cyclic amide compound. Specific but non-limiting examples of the cyclic amide compound may include respective compounds represented by the following formulas (31-1) to (31-4).

[Chem. 12]

 (31-1)

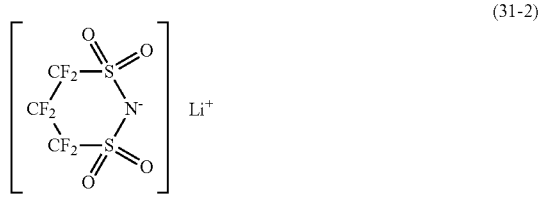 (31-2)

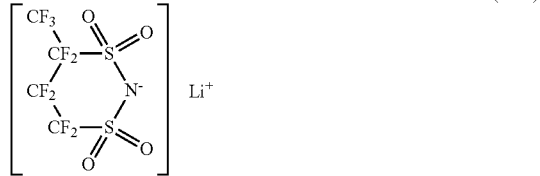 (31-3)

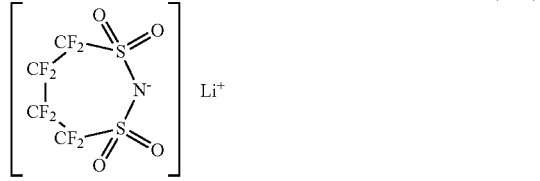 (31-4)

The compound represented by the formula (32) is a chain methide compound. Specific but non-limiting examples of the chain methide compound may include lithium tris(trifluoromethanesulfonyl)methide (LiC(CF$_3$SO$_2$)$_3$).

Moreover, the electrolyte salt may be a phosphorus-fluorine-containing salt such as lithium difluorophosphate (LiPF$_2$O$_2$) and lithium fluorophosphate (Li$_2$PFO$_3$).

(Content of Electrolyte Salt)

A content of the electrolyte salt with respect to the solvent (hereinafter simply referred to as "content of the electrolyte salt") is set to be sufficiently large. Specifically, the content of the electrolyte salt is set to make the number of molecules of the electrolyte salt equal to or larger than the number of molecules of the solvent.

The content of the electrolyte salt is set to make the number of molecules of the electrolyte salt equal to or larger than the number of molecules of the solvent, which improves voltage resistance of the electrolytic solution. Accordingly, even if the electrolytic solution is used in a bipolar secondary battery, the electrolytic solution is resistant to decomposition during charge and discharge.

Specifically, the bipolar secondary battery achieves an advantage that a high voltage is obtained, as described above. However, in a case where the content of the electrolyte salt is small in the electrolytic solution used for the bipolar secondary battery, more specifically, in a case where the content of the electrolyte salt is set to make the number of molecules of the electrolyte salt smaller than the number of molecule of the solvent, voltage resistance of the electrolytic solution is insufficient, and the electrolytic solution is therefore more prone to be decomposed during charge and discharge. It is considered that in the case where the content of the electrolyte salt is small, the number of molecules of the solvent not solvated to the electrolyte salt in the electrolytic solution is too large.

In contrast, in a case where the content of the electrolyte salt is sufficiently large in the electrolytic solution used for the bipolar secondary battery, more specifically, in a case where the content of the electrolyte salt is set to make the number of molecules of the electrolyte salt equal to or larger than the number of molecule of the solvent, voltage resistance of the electrolytic solution is assured, and the electrolytic solution is therefore resistant to decomposition during charge and discharge. It is considered that in the case where the content of the electrolyte salt is sufficiently large, the number of molecules of the solvent not solvated to the electrolyte salt is sufficiently small.

In particular, in a case where the content of the electrolyte salt is too small, the electrolytic solution is seriously decomposed due to insufficient voltage resistance during charge and discharge. Accordingly, it is difficult to fundamentally charge and discharge the secondary battery from initial charge and initial discharge. However, in the case where the content of the electrolyte salt is sufficiently large, the electrolytic solution is sufficiently resistant to decomposition from the initial charge and the initial discharge. This makes it possible to repeatedly charge and discharge the secondary battery.

The content of the electrolyte salt is not particularly limited, as long as the number of molecules of the electrolyte salt is equal to or larger than the number of molecules of the solvent. In particular, the content of the electrolyte salt may be preferably 2 mol/kg or more, and more preferably 3 mol/kg or more, which makes the number of molecules of the solvent not solvated to the electrolyte salt sufficiently small, thereby making the electrolytic solution sufficiently resistant to decomposition during charge and discharge.

It is to be noted that in order to examine whether or not the content of the electrolyte salt is set to make the number of molecules of the electrolyte salt equal to or larger than the number of molecules of the solvent, for example, a solvation state of solvent molecules in the electrolytic solution may be examined with use of Raman spectroscopy, as described in, for example, Chem Electro Chem 2015, 2, 1687-1694, Yamada et al. Specifically, a Raman shift (cm$^-$) in a free state in which the solvent molecules are free is changed from that in a solvation state in which the solvent molecules are solvated to the electrolyte salt (the solvent molecules interact with electrolyte salt). Accordingly, in an analysis result of the electrolytic solution with use of Raman spectroscopy, if a position of a peak of a Raman shift derived from the solvent is shifted by 100% from a position corresponding to the free state to a position corresponding to the solvation state, it is possible to confirm that the number of molecules of the electrolyte salt is sufficient to solvate all of the molecules of the solvent.

(Preferable Composition of Electrolytic Solution)

A composition of the electrolytic solution is not particularly limited, as long as the content of the electrolyte salt is set to the above-described appropriate content.

Specific but non-limiting examples of the composition of the electrolytic solution may include an electrolytic solution (the content of the electrolyte salt=4 mol/kg) in which the solvent includes propylene carbonate and the electrolyte salt includes lithium tetrafluoroborate, an electrolytic solution (the content of the electrolyte salt=4 mol/kg) in which the solvent includes propylene carbonate and the electrolyte salt includes lithium hexafluorophosphate, and an electrolytic solution (the content of the electrolyte salt=5 mol/kg) in which the solvent includes acetonitrile and the electrolyte salt includes lithium bis(fluorosulfonyl)amide. It goes without saying that an electrolytic solution having any composition other than the compositions mentioned above may be used.

In particular, the electrolytic solution (the content of the electrolyte salt=5 mol/kg) in which the solvent includes acetonitrile and the electrolyte salt includes lithium bis(fluorosulfonyl)amide may be preferable, which enhances conductivity and decreases viscosity, in addition to improving voltage resistance.

Moreover, the electrolytic solution (the content of the electrolyte salt=4 mol/kg) in which the solvent includes propylene carbonate and the electrolyte salt include lithium tetrafluoroborate may be preferable, which further improves voltage resistance.

Further, the electrolytic solution (the content of the electrolyte salt=4 mol/kg) in which the solvent includes propylene carbonate and the electrolyte salt includes lithium hexafluorophosphate may be preferable, which obtains sufficient voltage resistance.

[Other Components]

It is to be noted that the secondary battery may include one or more of components other than the components mentioned above. Non-limiting examples of the other components may include, in addition to a cathode lead coupled to the cathode 10 (the cathode current collector 11) and an anode lead coupled to the anode 20 (the anode current collector 21), a containing member (a package member) containing the cathode 10, the anode 20, the intermediate electrode 30, the separator 40, and other components.

<1-2. Operation>

Next, description is given of operation of the secondary battery. The secondary battery may operate as follows, for example.

When the secondary battery is charged, lithium ions may be extracted from the cathode 10 (the first cathode active material layer 12), and the extracted lithium ions may be inserted in the intermediate electrode 30 (the second anode active material layer 32) through the electrolytic solution. Moreover, when the secondary battery is charged, lithium ions may be extracted from the intermediate electrode 30 (the second cathode active material layer 33) and the extracted lithium ions may be inserted in the anode 20 (the first anode active material layer 22) through the electrolytic solution.

In contrast, when the secondary battery is discharged, lithium ions may be extracted from the anode 20 (the first anode active material layer 22), and the extracted lithium ions may be inserted in the intermediate electrode 30 (the second cathode active material layer 33) through the electrolytic solution. Moreover, when the secondary battery is discharged, lithium ions may be extracted from the intermediate electrode 30 (the second anode active material layer 32), and the extracted lithium ions may be inserted in the cathode 10 (the first cathode active material layer 12) through the electrolytic solution.

<1-3. Manufacturing Method>

Next, description is given of a method of manufacturing the secondary battery. The secondary battery may be manufactured by the following procedure, for example.

[Fabrication of Cathode]

In a case where the cathode 10 is fabricated, first, the cathode active material, and, on as-necessary basis, for example, the cathode binder and the cathode conductor may be mixed to obtain a cathode mixture. Subsequently, the cathode mixture may be put into the solvent such as an organic solvent, and the solvent may be stirred to obtain paste cathode mixture slurry. Lastly, a single surface of the cathode current collector 11 may be coated with the cathode mixture slurry, and thereafter, the coated cathode mixture slurry may be dried to form the first cathode active material layer 12. Thereafter, the first cathode active material layer 12 may be compression-molded with use of, for example, a roll pressing machine on as-necessary basis. In this case, the first cathode active material layer 12 may be heated, or may be compression-molded a plurality of times.

[Fabrication of Anode]

In a case where the anode 20 is fabricated, the first anode active material layer 22 may be formed on a single surface of the anode current collector 21 by a procedure similar to the foregoing procedure of fabricating the cathode 10. More specifically, the anode active material, and any other material such as the anode binder and the anode conductor may be mixed to obtain an anode mixture. Subsequently, the anode mixture may be put into the solvent such as an organic solvent to obtain paste anode mixture slurry. Next, the single surface of the anode current collector 21 may be coated with the anode mixture slurry, and thereafter, the coated anode mixture slurry may be dried to form the first anode active material layer 22.

[Fabrication of Intermediate Electrode]

In a case where the intermediate electrode 30 is fabricated, the second anode active material layer 32 may be formed on one surface of the intermediate current collector 31 by a procedure similar to the foregoing procedure of fabricating the anode 20, and the second cathode active material layer 33 may be formed on the other surface of the intermediate current collector 31 by a procedure similar to the foregoing procedure of fabricating the cathode 10.

[Preparation of Electrolytic Solution]

In a case where the electrolytic solution is prepared, the electrolyte salt may be added to the solvent, and the solvent may be stirred. In this case, the content of the electrolyte salt may be adjusted to make the number of molecules of the electrolyte salt equal to or larger than the number of molecules of the solvent.

[Assembling of Secondary Battery]

In a case where the secondary battery is assembled, the cathode 10, the anode 20, and the intermediate electrode 30 may be stacked with the separators 40 impregnated with the electrolytic solution in between. In this case, the separator 40 may be inserted between the cathode 10 and the intermediate electrode 30, and the separator 40 may be inserted between the anode 20 and the intermediate electrode 30.

Thus, a stacked structure including the cathode 10, the anode 20, the intermediate electrode 30, and the separator 40 may be formed, and each of the cathode 10, the anode 20, the intermediate electrode 30, and the separator 40 may be impregnated with the electrolytic solution. Thus, the secondary battery is completed.

<1-4. Action and Effects>

According to the secondary battery, in the bipolar secondary battery in which each of the anode 20 and the intermediate electrode 30 includes the titanium-containing compound, the content of the electrolyte salt is set to make the number of molecules of the electrolyte salt equal to or larger than the number of molecules of the solvent in the electrolytic solution. In this case, voltage resistance of the electrolytic solution is improved as described above. Accordingly, even if the electrolytic solution is used in the bipolar secondary battery, the electrolytic solution is resistant to decomposition during charge and discharge. This makes it possible to achieve superior battery characteristics.

In particular, the content of the electrolyte salt is 2 mol/kg or more, and more specifically 3 mol/kg or more, which makes the electrolytic solution sufficiently resistant to decomposition during charge and discharge. This makes it possible to achieve a higher effect.

Moreover, in a case where the solvent includes propylene carbonate and the electrolyte salt includes lithium tetrafluoroborate, in a case where the solvent includes propylene carbonate and the electrolyte salt includes lithium hexafluorophosphate, or in a case where the solvent includes acetonitrile and the electrolyte salt includes lithium bis(fluorosulfonyl)amide, voltage resistance of the electrolytic solution is sufficiently improved, which makes it possible to achieve a higher effect.

Further, the titanium-containing compound includes one or both of the titanium oxide and the lithium-titanium composite oxide, which sufficiently suppresses decomposition reaction of the electrolytic solution resulting from reactivity of the anode 20. This makes it possible to achieve a higher effect.

2. Modification Examples

The configuration of the secondary battery according to the embodiment of the technology may be modified as appropriate.

Modification Example 1

In FIG. 1, one intermediate electrode 30 is provided between the cathode 10 and the anode 20.

Alternatively, two or more intermediate electrodes 30 may be provided between the cathode 10 and the anode 20. In this case, the two or more intermediate electrodes 30 may be stacked, with the separator 40 in between, between the cathode 10 and the anode 20. In particular, two intermediate electrodes 30 adjacent to each other may be disposed so that the second anode active material layer 32 and the second cathode active material layer 33 face each other with the separator 40 in between.

Even in this case, the content of the electrolyte salt is set to the foregoing appropriate content, which improves voltage resistance of the electrolytic solution. This makes it possible to achieve similar effects.

Modification Example 2

In FIG. 1, the electrolytic solution that is a liquid electrolyte is used.

Figure 2:
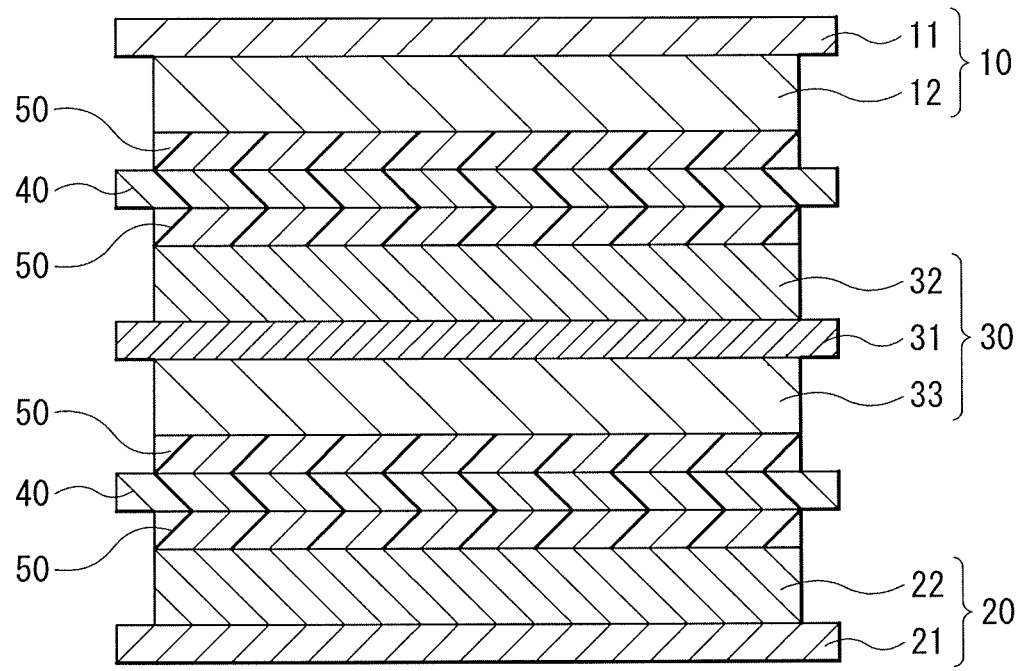
FIG. 2 is a cross-sectional view of a modification example of the configuration of the secondary battery.

Alternatively, an electrolyte layer 50 that is a gel electrolyte may be used in place of the foregoing electrolytic solution, as illustrated in FIG. 2 corresponding to FIG. 1.

The electrolyte layer 50 may be provided, for example, between the cathode 10 (the first cathode active material layer 12) and the separator 40, and the electrolyte layer 50 may be provided, for example, between the separator 40 and the intermediate electrode 30 (the second anode active material layer 32). Moreover, the electrolyte layer 50 may be provided, for example, between the anode 20 (the first anode active material layer 22) and the separator 40, and the electrolyte layer 50 may be provided, for example, between the separator 40 and the intermediate electrode 30 (the second cathode active material layer 33).

In other words, four electrolyte layers 50 are illustrated in FIG. 2. However, only any one, any two, or any three electrolyte layers 50 of the four electrolyte layers 50 may be used.

The electrolyte layers 50 may include an electrolytic solution and a polymer compound. Note that the electrolyte layers 50 may include one or more of other materials such as an additive. Details of the composition of the electrolytic solution are as described above. Namely, the content of the electrolyte salt is set to make the number of molecules of the electrolyte salt equal to or larger than the number of molecules of the solvent.

The electrolyte layers 50 described here may each be a so-called gel electrolyte, and the electrolytic solution may be held by the polymer compound in the electrolyte layers 50. The gel electrolyte achieves high ionic conductivity (for example, 1 mS/cm or more at room temperature), and prevents liquid leakage of the electrolytic solution.

The polymer compound may include, for example, one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, poly(methyl methacrylate), polyacrylic acid, polymethacrylic acid, styrene-butadiene rubber, nitrile-butadiene rubber, polystyrene, and polycarbonate. In addition thereto, the polymer compound may be a copolymer. The copolymer may be, for example, a copolymer of vinylidene fluoride and hexafluoropropylene. In particular, polyvinylidene fluoride may be preferable as a homopolymer, and a copolymer of vinylidene fluoride and hexafluoropropylene may be preferable as a copolymer. Such polymer compounds are electrochemically stable.

The secondary battery including the electrolyte layer 50 may operate as follows, for example.

When the secondary battery is charged, lithium ions may be extracted from the cathode 10 (the first cathode active material layer 12), and the extracted lithium ions may be inserted in the intermediate electrode 30 (the second anode active material layer 32) through the electrolyte layer 50. Moreover, when the secondary battery is charged, lithium ions may be extracted from the intermediate electrode 30 (the second cathode active material layer 33), and the extracted lithium ions may be inserted in the anode 20 (the first anode active material layer 22) through the electrolyte layer 50.

In contrast, when the secondary battery is discharged, lithium ions may be extracted from the anode 20 (the first anode active material layer 22), and the extracted lithium ions may be inserted in the intermediate electrode 30 (the second cathode active material layer 33) through the electrolyte layer 50. Moreover, when the secondary battery is discharged, lithium ions may be extracted from the intermediate electrode 30 (the second anode active material layer 32), and the extracted lithium ions may be inserted in the cathode 10 (the first cathode active material layer 12) through the electrolyte layer 50.

The gel electrolyte layer 50 may be manufactured, for example, by the following procedure. First, the electrolytic solution, the polymer compound, an organic solvent, etc. may be mixed to form a mixture, and the mixture may be stirred to prepare a sol precursor solution. Subsequently, the cathode 10 (the first cathode active material layer 12) may be coated with the precursor solution, and the coated precursor solution may be dried to form the gel electrolyte layer 50. Likewise, each of the anode 20 (the first anode active material layer 22) and the intermediate electrode 30 (the second anode active material layer 32 and the second cathode active material layer 33) may be coated with the precursor solution, and the coated precursor solution may be dried to form the gel electrolyte layers 50.

Even in the secondary battery including the electrolyte layer 50, the content of the electrolyte salt is set to the foregoing appropriate content, which improves voltage resistance of the electrolytic solution. This makes it possible to achieve similar effects.

3. Applications of Secondary Battery

Next, description is given of application examples of any of the secondary batteries mentioned above.

Applications of the secondary battery are not particularly limited as long as the secondary battery is applied to, for example, a machine, a device, an instrument, an apparatus, and a system (a collective entity of, for example, a plurality of devices) that are able to use the secondary battery as a driving power source, an electric power storage source for electric power accumulation, or any other source. The secondary battery used as the power source may be a main power source or an auxiliary power source. The main power source is a power source used preferentially irrespective of presence or absence of any other power source. The auxiliary power source may be a power source used instead of the main power source or used being switched from the main power source on as-necessary basis. In a case where the secondary battery is used as the auxiliary power source, the kind of the main power source is not limited to the secondary battery.

Examples of the applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof may include: a mobile lifestyle appliance such as an electric shaver; a storage device such as a backup power source and a memory card; an electric power tool such as an electric drill and an electric saw; a battery pack used as an attachable and detachable power source of, for example, a notebook personal computer; a medical electronic apparatus such as a pacemaker and a hearing aid; an electric vehicle such as an electric automobile (including a hybrid automobile); and an electric power storage system such as a home battery system for accumulation of electric power for, for example, emergency. It goes without saying that the secondary battery may be employed for an application other than the applications mentioned above.

In particular, the secondary battery may be effectively applicable to, for example, the battery pack, the electric vehicle, the electric power storage system, the electric power tool, and the electronic apparatus. In these applications, superior battery characteristics are demanded, and using the secondary battery of the embodiment of the technology makes it possible to effectively improve performance. It is to be noted that the battery pack is a power source that uses the secondary battery, and may use, for example, a single battery and an assembled battery, as described later. The electric vehicle is a vehicle that operates (runs) using the secondary battery as a driving power source, and may be an automobile (such as a hybrid automobile) that includes together a drive source other than the secondary battery, as described above. The electric power storage system is a system that uses the secondary battery as an electric power storage source. For example, in a home electric power storage system, electric power is accumulated in the secondary battery that is the electric power storage source, which makes it possible to use, for example, home electric products with use of the accumulated electric power. The electric power tool is a tool in which a movable section (such as a drill) is allowed to be moved with use of the secondary battery as a driving power source. The electronic apparatus is an apparatus that executes various functions with use of the secondary battery as a driving power source (an electric power supply source).

Hereinafter, specific description is given of some application examples of the secondary battery. It is to be noted that configurations of the respective application examples described below are mere examples, and may be changed as appropriate.

<3-1. Battery Pack (Single Battery)>

Figure 3:
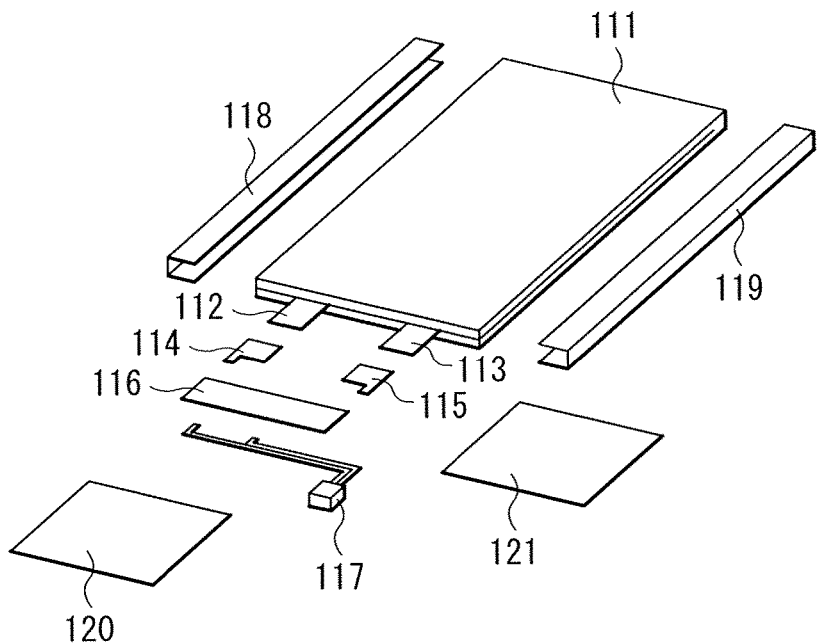
FIG. 3 is a perspective view of a configuration of an application example (a battery pack: single battery) of the secondary battery.
Figure 4:
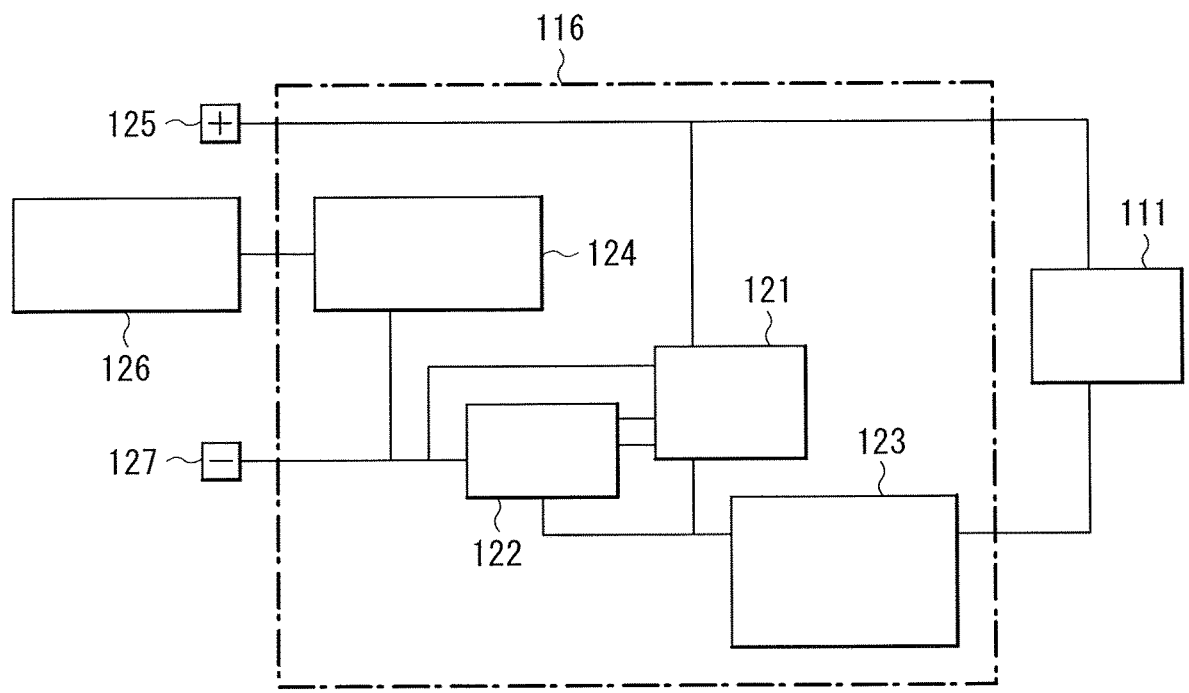
FIG. 4 is a block diagram illustrating a configuration of the battery pack illustrated in FIG. 3.

FIG. 3 illustrates a perspective configuration of a battery pack using a single battery. FIG. 4 illustrates a block configuration of the battery pack illustrated in FIG. 3. It is to be noted that FIG. 3 illustrates the battery back in an exploded state.

The battery back described here is a simple battery pack using one secondary battery (a so-called soft pack), and may be mounted in, for example, an electronic apparatus typified by a smartphone. For example, the battery pack may include a power source 111 that is a laminated film type secondary battery, and a circuit board 116 coupled to the power source 111, as illustrated in FIG. 3. A cathode lead 112 and an anode lead 113 may be attached to the power source 111.

A pair of adhesive tapes 118 and 119 may be adhered to both side surfaces of the power source 111. A protection circuit module (PCM) may be provided in the circuit board 116. The circuit board 116 may be coupled to the cathode lead 112 through a tab 114, and be coupled to the anode lead 113 through a tab 115. Moreover, the circuit board 116 may be coupled to a lead 117 provided with a connector for external connection. It is to be noted that while the circuit board 116 is coupled to the power source 111, the circuit board 116 may be protected by a label 120 and an insulating sheet 121. The label 120 may be used to fix, for example, the circuit board 116 and the insulating sheet 121.

Moreover, for example, the battery pack may include the power source 111 and the circuit board 116 as illustrated in FIG. 4. The circuit board 116 may include, for example, a controller 121, a switch section 122, a positive temperature coefficient (PTC) device 123, and a temperature detector 124. The power source 111 may be connectable to outside through a cathode terminal 125 and an anode terminal 127, and may be thereby charged and discharged through the cathode terminal 125 and the anode terminal 127. The temperature detector 124 may detect a temperature with use of a temperature detection terminal (a so-called T terminal) 126.

The controller 121 controls an operation of the entire battery pack (including a used state of the power source 111), and may include, for example, a central processing unit (CPU) and a memory.

For example, in a case where a battery voltage reaches an overcharge detection voltage, the controller 121 may so cause the switch section 122 to be disconnected that a charge current does not flow into a current path of the power source 111. Moreover, for example, in a case where a large current flows during charge, the controller 121 may cause the switch section 122 to be disconnected, thereby blocking the charge current.

In contrast, for example, in a case where the battery voltage reaches an overdischarge detection voltage, the controller 121 may so cause the switch section 122 to be disconnected that a discharge current does not flow into the current path of the power source 111. Moreover, for example, in a case where a large current flows during discharge, the controller 121 may cause the switch section 122 to be disconnected, thereby blocking the discharge current.

It is to be noted that the overcharge detection voltage is not particularly limited, but may be, for example, 4.2 V±0.05 V, and the overdischarge detection voltage is not particularly limited, but may be, for example, 2.4 V±0.1 V.

The switch section 122 switches the used state of the power source 111, that is, presence or absence of connection of the power source 111 to an external device in accordance with an instruction from the controller 121. The switch section 122 may include, for example, a charge control switch and a discharge control switch. Each of the charge control switch and the discharge control switch may be, for example, a semiconductor switch such as a field-effect transistor using a metal oxide semiconductor (MOSFET). It is to be noted that the charge current and the discharge current may be detected on the basis of on-resistance of the switch section 122.

The temperature detector 124 measures a temperature of the power source 111, and outputs a result of the measurement to the controller 121. The temperature detector 124 may include, for example, a temperature detecting element such as a thermistor. It is to be noted that the result of the measurement by the temperature detector 124 may be used, for example, in a case where the controller 121 performs charge and discharge control at the time of abnormal heat generation and in a case where the controller 121 performs a correction process at the time of calculating remaining capacity.

It is to be noted that the circuit board 116 may not include the PTC device 123. In this case, a PTC device may be separately attached to the circuit board 116.

<3-2. Battery Pack (Assembled Battery)>

Figure 5:
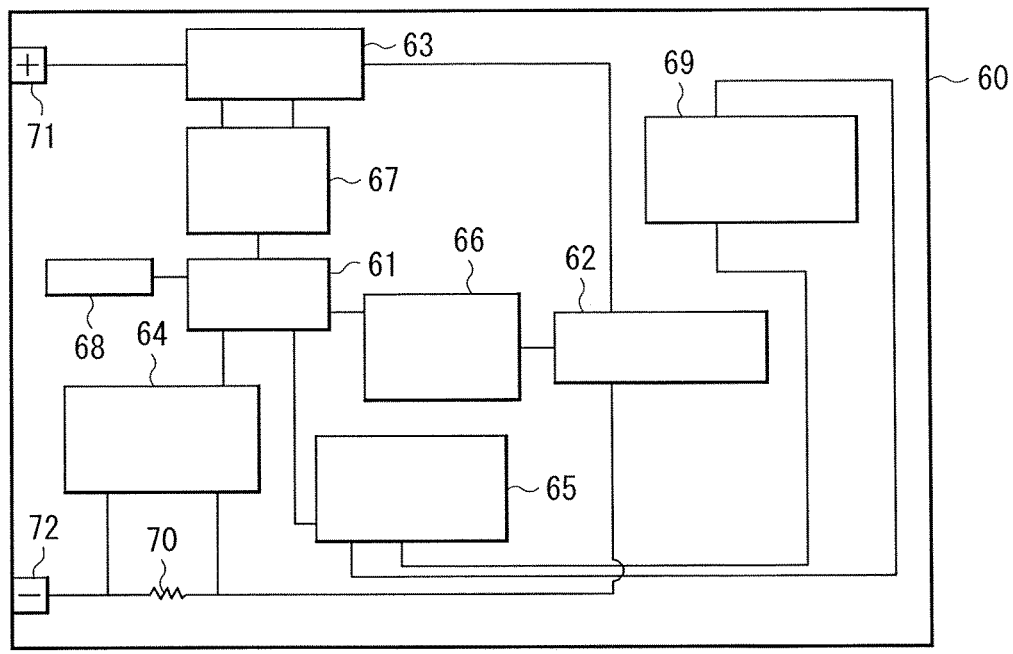
FIG. 5 is a block diagram illustrating a configuration of an application example (a battery pack: assembled battery) of the secondary battery.

FIG. 5 illustrates a block configuration of a battery pack using an assembled battery.

For example, the battery pack may include a controller 61, a power source 62, a switch section 63, a current measurement section 64, a temperature detector 65, a voltage detector 66, a switch controller 67, a memory 68, a temperature detecting element 69, a current detection resistance 70, a cathode terminal 71, and an anode terminal 72 inside a housing 60. The housing 60 may include, for example, a plastic material.

The controller 61 controls an operation of the entire battery pack (including a used state of the power source 62). The controller 61 may include, for example, a CPU. The power source 62 may be, for example, an assembled battery that includes two or more secondary batteries. The secondary batteries may be connected in series, in parallel, or in series-parallel combination. To give an example, the power source 62 may include six secondary batteries in which two sets of series-connected three batteries are connected in parallel to each other.

The switch section 63 switches the used state of the power source 62, that is, presence or absence of connection of the power source 62 to an external device in accordance with an instruction from the controller 61. The switch section 63 may include, for example, a charge control switch, a discharge control switch, a charging diode, and a discharging diode. Each of the charge control switch and the discharge control switch may be, for example, a semiconductor switch such as a field-effect transistor that uses a metal oxide semiconductor (a MOSFET).

The current measurement section 64 measures a current with use of the current detection resistance 70, and outputs a result of the measurement to the controller 61. The temperature detector 65 measures a temperature with use of the temperature detecting element 69, and outputs a result of the measurement to the controller 61. The result of the temperature measurement may be used, for example, in a case where the controller 61 performs charge and discharge control at the time of abnormal heat generation and in a case where the controller 61 performs a correction process at the time of calculating remaining capacity. The voltage detector 66 measures voltages of the secondary batteries in the power source 62, performs analog-to-digital conversion on the measured voltage, and supplies the resultant to the controller 61.

The switch controller 67 controls an operation of the switch section 63 in accordance with signals inputted from the current measurement section 64 and the voltage detector 66.

For example, in a case where a battery voltage reaches an overcharge detection voltage, the switch controller 67 may so cause the switch section 63 (the charge control switch) to be disconnected that a charge current does not flow into a current path of the power source 62. This makes it possible to perform only discharge through the discharging diode in the power source 62. It is to be noted that, for example, when a large current flows during charge, the switch controller 67 may block the charge current.

Further, for example, in a case where the battery voltage reaches an overdischarge detection voltage, the switch controller 67 may so cause the switch section 63 (the discharge control switch) to be disconnected that a discharge current does not flow into the current path of the power source 62. This makes it possible to perform only charge through the charging diode in the power source 62. It is to be noted that, for example, when a large current flows during discharge, the switch controller 67 may block the discharge current.

It is to be noted that the overcharge detection voltage is not particularly limited, but may be, for example, 4.2 V±0.05 V, and the overdischarge detection voltage is not particularly limited, but may be, for example, 2.4 V±0.1 V.

The memory 68 may include, for example, an EEPROM that is a non-volatile memory. The memory 68 may hold, for example, numerical values calculated by the controller 61 and information of the secondary battery measured in a manufacturing process (such as internal resistance in an initial state). It is to be noted that, in a case where the memory 68 holds full charge capacity of the secondary battery, the controller 61 is allowed to comprehend information such as remaining capacity.

The temperature detecting element 69 measures a temperature of the power source 62, and outputs a result of the measurement to the controller 61. The temperature detecting element 69 may include, for example, a thermistor.

The cathode terminal 71 and the anode terminal 72 are terminals that may be coupled to, for example, an external device (such as a notebook personal computer) driven with use of the battery pack or an external device (such as a battery charger) used for charge of the battery pack. The power source 62 is charged and discharged via the cathode terminal 71 and the anode terminal 72.

<3-3. Electric Vehicle>

Figure 6:
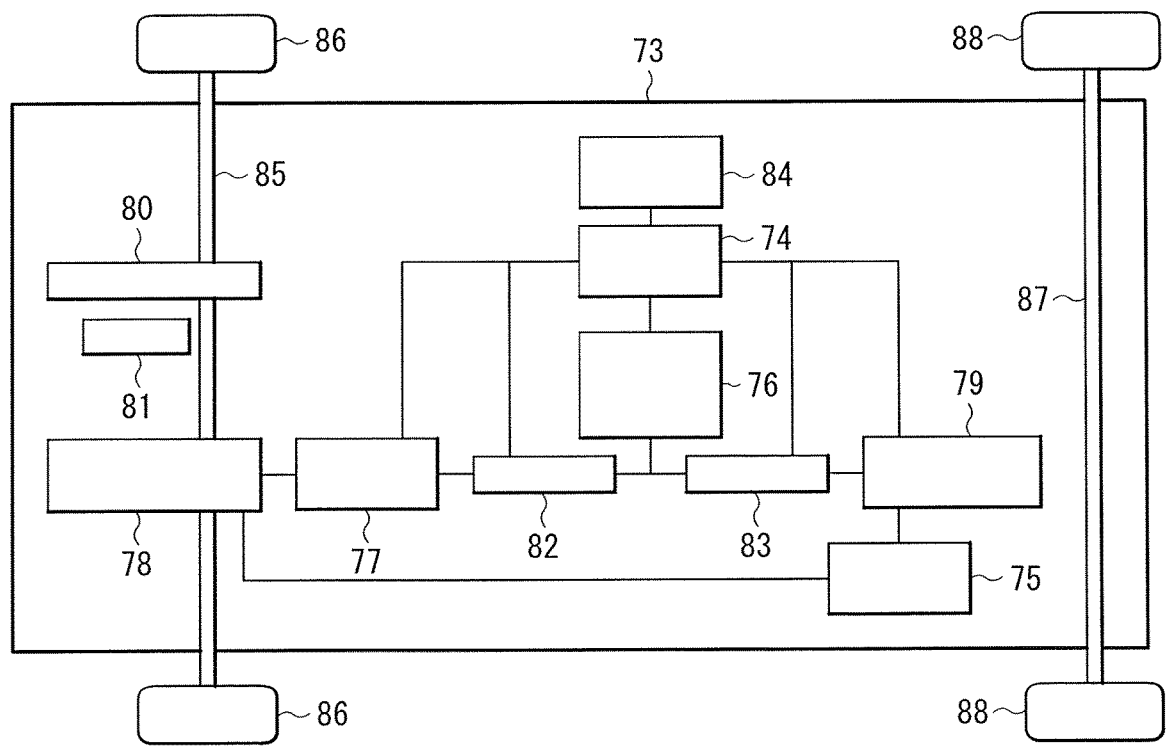
FIG. 6 is a block diagram illustrating a configuration of an application example (an electric vehicle) of the secondary battery.

FIG. 6 illustrates a block configuration of a hybrid automobile that is an example of an electric vehicle.

The electric vehicle may include, for example, a controller 74, an engine 75, a power source 76, a driving motor 77, a differential 78, an electric generator 79, a transmission 80, a clutch 81, inverters 82 and 83, and various sensors 84 inside a housing 73 made of a metal. Other than the components mentioned above, the electric vehicle may include, for example, a front drive shaft 85 and a front tire 86 that are coupled to the differential 78 and the transmission 80, and a rear drive shaft 87, and a rear tire 88.

The electric vehicle may be runnable with use of one of the engine 75 and the motor 77 as a drive source, for example. The engine 75 is a main power source, and may be, for example, a petrol engine. In a case where the engine 75 is used as the power source, drive power (torque) of the engine 75 may be transferred to the front tire 86 or the rear tire 88 via the differential 78, the transmission 80, and the clutch 81 that are drive sections, for example. It is to be noted that the torque of the engine 75 may be also transferred to the electric generator 79. With use of the torque, the electric generator 79 generates alternating-current electric power. The generated alternating-current electric power is converted into direct-current electric power via the inverter 83, and the converted electric power is accumulated in the power source 76. In a case where the motor 77 that is a conversion section is used as the power source, electric power (direct-current electric power) supplied from the power source 76 is converted into alternating-current electric power via the inverter 82, and the motor 77 is driven with use of the alternating-current electric power. Drive power (torque) obtained by converting the electric power by the motor 77 may be transferred to the front tire 86 or the rear tire 8 via the differential 78, the transmission 80, and the clutch 81 that are the drive sections, for example.

It is to be noted that in a case where speed of the electric vehicle is reduced by a brake mechanism, resistance at the time of speed reduction may be transferred to the motor 77 as torque, and the motor 77 may generate alternating-current electric power by utilizing the torque. It may be preferable that this alternating-current electric power be converted into direct-current electric power via the inverter 82, and the direct-current regenerative electric power be accumulated in the power source 76.

The controller 74 controls an operation of the entire electric vehicle, and may include, for example, a CPU. The power source 76 includes one or more secondary batteries. The power source 76 may be coupled to an external power source, and the power source 76 may be allowed to accumulate electric power by receiving electric power supply from the external power source. The various sensors 84 may be used, for example, for control of the number of revolutions of the engine 75 and for control of an opening level (a throttle opening level) of a throttle valve. The various sensors 84 may include, for example, one or more of sensors such as a speed sensor, an acceleration sensor, and an engine frequency sensor.

It is to be noted that, although the description has been given with reference to an example in which the electric vehicle is the hybrid automobile, the electric vehicle may be a vehicle (an electric automobile) that operates with use of only the power source 76 and the motor 77 and without using the engine 75.

<3-4. Electric Power Storage System>

Figure 7:
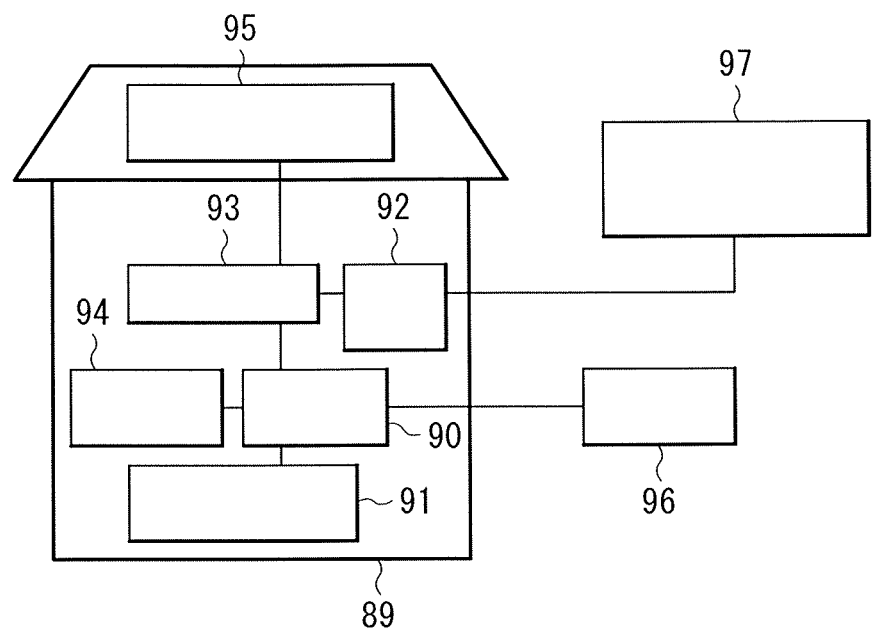
FIG. 7 is a block diagram illustrating a configuration of an application example (an electric power storage system) of the secondary battery.

FIG. 7 illustrates a block configuration of an electric power storage system.

The electric power storage system may include, for example, a controller 90, a power source 91, a smart meter 92, and a power hub 93 inside a house 89 such as a general residence or a commercial building.

In this example, the power source 91 may be coupled to an electric device 94 provided inside the house 89 and may be allowed to be coupled to an electric vehicle 96 parked outside the house 89, for example. Further, for example, the power source 91 may be coupled to a private power generator 95 provided in the house 89 via the power hub 93, and may be allowed to be coupled to an outside concentrating electric power system 97 via the smart meter 92 and the power hub 93.

It is to be noted that the electric device 94 may include, for example, one or more home electric products. Non-limiting examples of the home electric products may include a refrigerator, an air conditioner, a television, and a water heater. The private power generator 95 may include, for example, one or more of a solar power generator, a wind power generator, and other power generators. The electric vehicle 96 may include, for example, one or more of an electric automobile, an electric motorcycle, a hybrid automobile, and other electric vehicles. The concentrating electric power system 97 may include, for example, one or more of a thermal power plant, an atomic power plant, a hydraulic power plant, a wind power plant, and other power plants.

The controller 90 controls an operation of the entire electric power storage system (including a used state of the power source 91), and may include, for example, a CPU. The power source 91 includes one or more secondary batteries. The smart meter 92 may be an electric power meter that is compatible with a network and is provided in the house 89 demanding electric power, and may be communicable with an electric power supplier, for example. Accordingly, for example, while the smart meter 92 communicates with outside, the smart meter 92 controls balance between supply and demand in the house 89, which allows for effective and stable energy supply.

In the electric power storage system, for example, electric power may be accumulated in the power source 91 from the concentrating electric power system 97, that is an external power source, via the smart meter 92 and the power hub 93, and electric power may be accumulated in the power source 91 from the private power generator 95, that is an independent power source, via the power hub 93. The electric power accumulated in the power source 91 is supplied to the electric device 94 and the electric vehicle 96 in accordance with an instruction from the controller 90. This allows the electric device 94 to be operable, and allows the electric vehicle 96 to be chargeable. In other words, the electric power storage system is a system that makes it possible to accumulate and supply electric power in the house 89 with use of the power source 91.

The electric power accumulated in the power source 91 is allowed to be utilized optionally. Hence, for example, electric power may be accumulated in the power source 91 from the concentrating electric power system 97 in the middle of night when an electric rate is inexpensive, and the electric power accumulated in the power source 91 may be used during daytime hours when the electric rate is expensive.

It is to be noted that the foregoing electric power storage system may be provided for each household (each family unit), or may be provided for a plurality of households (a plurality of family units).

Moreover, the electric power storage system may be applied not only to the consumer applications such as the foregoing general residence but also to commercial applications such as the foregoing concentrating electric power system 97, i.e., an electric power supply source typified by a thermal power plant, an atomic power plant, a hydraulic power plant, and a wind power plant. More specifically, description has been given with reference to the case where the electric power storage system is applied to household applications; however, the electric power storage system may be applied to, for example, industrial applications such as an electric power network for grid-connected power (so-called grid) to be used as an electric storage apparatus.

<3-5. Electric Power Tool>

Figure 8:
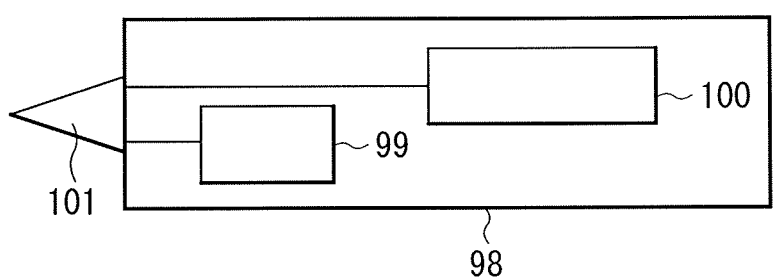
FIG. 8 is a block diagram illustrating a configuration of an application example (an electric power tool) of the secondary battery.

FIG. 8 illustrates a block configuration of an electric power tool.

The electric power tool described here may be, for example, an electric drill. The electric power tool may include a controller 99 and a power source 100 inside a tool body 98, for example. A drill section 101 that is a movable section may be attached to the tool body 98 in an operable (rotatable) manner, for example.

The tool body 98 may include, for example, a plastic material. The controller 99 controls an operation of the entire electric power tool (including a used state of the power source 100), and may include, for example, a CPU. The power source 100 includes one or more secondary batteries. The controller 99 allows electric power to be supplied from the power source 100 to the drill section 101 in accordance with an operation by an operation switch.

EXAMPLES

Description is given of examples of the technology.

Experimental Examples 1 to 4

The bipolar secondary batteries (lithium-ion secondary batteries) illustrated in FIG. 1 were fabricated, and thereafter, battery characteristics of the secondary batteries were evaluated.

[Fabrication of Secondary Battery]

The cathode 10 was fabricated as follows. First, 90 parts by mass of a cathode active material ($LiFePO_4$ that was a lithium-containing phosphate compound), 5 parts by mass of a cathode binder (polyvinylidene fluoride), and 5 part by mass of a cathode conductor (carbon black) were mixed to obtain a cathode mixture. Subsequently, the cathode mixture was put into an organic solvent (N-methyl-2-pyrrolidone), and thereafter, the organic solvent was stirred to obtain paste cathode mixture slurry. Subsequently, a single surface of the cathode current collector 11 (an aluminum foil having a thickness of 15 µm) was coated with the cathode mixture slurry with use of a coating apparatus, and thereafter, the cathode mixture slurry was dried to form the first cathode active material layer 12. Lastly, the first cathode active material layer 12 was compression-molded with use of a roll pressing machine.

The anode 20 was fabricated as follows. First, 90 parts by mass of an anode active material ($Li_4Ti_5O_{12}$ that was a lithium-titanium composite oxide), 5 parts by mass of an anode binder (polyvinylidene fluoride), and 5 parts by mass of an anode conductor (carbon black) were mixed to obtain an anode mixture. Subsequently, the anode mixture was put into an organic solvent (N-methyl-2-pyrrolidone), and thereafter, the organic solvent was stirred to obtain paste anode mixture slurry. Subsequently, a single surface of the anode current collector 21 (an aluminum foil having a thickness of 15 km) was coated with the anode mixture slurry, and thereafter, the anode mixture slurry was dried to form the first anode active material layer 22. Lastly, the first anode active material layer 22 was compression-molded with use of a roll pressing machine.

The intermediate electrode 30 was fabricated as follows. The second anode active material layer 32 was formed on one surface of the intermediate current collector 31 (an aluminum foil having a thickness of 15 km) by a procedure similar to the foregoing procedure of forming the first anode active material layer 22, and thereafter, the second cathode active material layer 33 was formed on the other surface of the intermediate current collector 31 by a procedure similar to the foregoing procedure of forming the first cathode active material layer 12.

The electrolytic solution was prepared as follows. An electrolyte salt was added into a solvent, and the solvent was stirred. The kind of the solvent, the kind of the electrolyte salt, and the content (mol/kg) of the electrolyte salt are as illustrated in Table 1. In this case, the content of the electrolyte salt was set to make a number N1 of molecules of the electrolyte salt equal to or larger than a number N2 of molecules of the solvent. In addition, for comparison, the content of the electrolyte salt was set to make the number N1 of the molecules of the electrolyte salt smaller than the number N2 of molecules of the solvent. In Table 1, "Relationship" indicates a relationship between the number N1 of molecules of the electrolyte salt and the number N2 of molecules of the solvent. It is to be noted that a method of examining whether or not the number N1 of molecules was equal to or larger than the number N2 of molecules was as described above (Raman spectroscopy).

In this case, propylene carbonate (PC), dimethyl carbonate (DMC), ethyl methyl carbonate (EMC), and acetonitrile (AN) were used as the solvent. Lithium tetrafluoroborate ($LiBF_4$), lithium hexafluorophosphate ($LiPF_6$), and lithium bis(fluorosulfonyl)amide (LiFSA) were used as the electrolyte salt. A mixture ratio (weight ratio) of solvents was propylene carbonate:dimethyl carbonate:ethyl methyl carbonate=40:30:30.

TABLE 1

| | | Electrolytic Solution | | | Charge-Discharge Efficiency (%) | Electrical Conductivity (mΩ/cm) |
|---|---|---|---|---|---|---|
| Experimental Example | Solvent | Electrolyte Salt | Content (mol/kg) | Relationship | | |
| | | Cathode active material: LiFePO$_4$ Anode active material: Li$_4$Ti$_5$O$_{12}$ | | | | |
| 1 | PC | LiBF$_4$ | 4 | N1 ≥ N2 | 88.5 | 0.41 |
| 2 | PC | LiPF$_6$ | 4 | N1 ≥ N2 | 78.0 | 0.35 |
| 3 | AN | LiFSA | 5 | N1 ≥ N2 | 13.9 | 28.9 |
| 4 | PC + DMC + EMC | LiPF$_6$ | 1 | N1 < N2 | Not Dischargeable | 8.7 |

Each of the secondary batteries was assembled as follows. The cathode 10 and the intermediate electrode 30 was stacked with the separator 40 (a cellulose film having a thickness of 20 μm) impregnated with the electrolytic solution in between, and the anode 20 and the intermediate electrode 30 were stacked with the separator 40 (a cellulose film having a thickness of 20 μm) impregnated with the electrolytic solution in between. In this case, the first cathode active material layer 12 and the second anode active material layer 32 faced each other with the separator 40 in between, and the first anode active material layer 22 and the second cathode active material layer 33 faced each other with the separator 40 in between.

Thus, a stacked structure including the cathode 10, the anode 20, the intermediate electrode 30, and the separators 40 was formed, and each of the cathode 10, the anode 20, the intermediate electrode 30, and the separators 40 was impregnated with the electrolytic solution. Thus, the secondary batteries were completed.

[Evaluation of Secondary Batteries]

Initial charge-discharge characteristics of the secondary batteries were examined to evaluate the battery characteristics of the secondary batteries, and conductivity of the electrolytic solution was examined to evaluate physical properties of the electrolytic solution, and results illustrated in Table 1 were thereby obtained.

The initial charge-discharge characteristics were examined as follows. First, each of the secondary batteries were charged and discharged in an ordinary temperature environment (at a temperature of 23° C.) to stabilize a battery state of each of the secondary batteries. Subsequently, each of the secondary batteries was charged in the same environment to measure charge capacity of each of the secondary batteries. Thereafter, each of the secondary batteries was discharged in the same environment to measure discharge capacity of each of the secondary batteries. Lastly, charge-discharge efficiency (%)=(discharge capacity/charge capacity)×100 was calculated.

When each of the secondary batteries was charged, each of the secondary batteries was charged at a constant current of 0.2 C until the voltage reached 4.8 V, and thereafter, each of the secondary batteries was charged at a constant voltage of 4.8 V until the current corresponded to 1/30 of the initial current (=0.2 C). When each of the secondary batteries was discharged, each of the secondary batteries was discharged at a constant current of 0.2 C until the voltage reached 1.0 V. It is to be noted that "0.2 C" refers to a current value at which the battery capacity (theoretical capacity) is completely discharged in 5 hours.

Conductivity was examined as follows. Electrical conductivity (me/cm) of the electrolytic solution was measured in a normal temperature environment (at a temperature of 23° C.) with use of MCM10 and WTSH10 available from Bio-Logic Science Instruments SAS located in France.

[Consideration]

In a case where a low-concentration electrolytic solution in which the content of the electrolyte salt was set to make the number N1 of molecules of the electrolyte salt smaller than the number N2 of molecules of the solvent was used (an experimental example 4), voltage resistance of the electrolytic solution was insufficient, as illustrated in Table 1; therefore, it was possible to charge the secondary battery, but it was not possible to discharge the secondary battery after charge.

In contrast, in a case where a high-concentration electrolytic solution in which the content of the electrolyte salt was set to make the number N1 of molecules of the electrolyte salt equal to or larger than the number N2 of molecules of the solvent was used (experimental examples 1 to 3), voltage resistance was assured; therefore, it was possible to charge and discharge the secondary battery.

In particular, in a case where the number N1 of molecules was equal to or larger than the number N2 of molecules, the following tendency was obtained. Firstly, in a case where the solvent included propylene carbonate and the electrolyte salt included lithium tetrafluoroborate or lithium hexafluorophosphate (the experimental examples 1 and 2), charge-discharge efficiency was remarkably increased. Secondly, in a case where the solvent included acetonitrile and the electrolyte salt included lithium bis(fluorosulfonyl)amide (the experimental example 3), electrical conductivity was remarkably increased.

As can be seen from the results illustrated in Table 1, in the bipolar secondary battery in which each of the anode and the intermediate electrode included the titanium-containing compound, the concentration of the electrolyte salt was set to make the number of molecules of the electrolyte salt equal to or larger than the number of molecules of the solvent in the electrolytic solution, which improved the initial charge-discharge characteristics. Accordingly, superior battery characteristics were obtained in the secondary battery.

Although the technology has been described above referring to some embodiments and examples, the technology is not limited thereto, and may be modified in a variety of ways.

Specifically, description has been given with reference to an example in which the cathode, the anode, the intermediate electrode, and the separator form a stacked structure, but the cathode, the anode, the intermediate electrode, and the separator may form any other structure such as a spirally wound structure. In a case where the spirally wound structure is adopted, for example, the cathode, the anode, the intermediate electrode, and the separator are stacked as illustrated in FIG. 1, and thereafter the cathode, the anode, the intermediate electrode and the separator are spirally wound.

Moreover, description has been given with reference to the lithium-ion secondary battery; however, the secondary battery is not limited thereto. The secondary battery may be, for example, a secondary battery in which capacity of an anode active material that has ability to insert and extract lithium is set smaller than capacity of a cathode to obtain capacity of an anode by the sum of capacity derived from a lithium insertion phenomenon and a lithium extraction phenomenon and capacity derived from a lithium precipitation phenomenon and a lithium dissolution phenomenon.

Further, description has been given with reference to the secondary battery using lithium as the electrode reactant; however, the electrode reactant is not limited to lithium. The electrode reactant may be, for example, any of other Group 1 elements such as sodium and potassium in the long form of the periodic table of the elements, Group 2 elements such as magnesium and calcium in the long form of the periodic table of the elements, and other light-metals such as aluminum.

Note that the effects described in the present specification are illustrative and non-limiting. The technology may have effects other than those described in the present specification.

It is to be noted that the technology may have the following configurations.

(1) A secondary battery, including:
a cathode including a cathode current collector and a first cathode active material layer, the first cathode active layer provided on the cathode current collector;
an anode including an anode current collector and a first anode active material layer, the first anode active material layer provided on the anode current collector to face the first cathode active material layer and including a titanium-containing compound;
an intermediate electrode provided between the cathode and the anode and including an intermediate current collector, a second anode active material layer, and a second cathode active material layer, the second anode active material layer provided on the intermediate current collector to face the first cathode active material layer and including the titanium-containing compound, and the second cathode active material layer provided on the intermediate current collector to face the first anode active material layer; and
an electrolytic solution including a solvent and an electrolyte salt and having number of molecules of the electrolyte salt equal to or larger than number of molecules of the solvent.

(2) The secondary battery according to (1), in which a content of the electrolyte salt with respect to the solvent is 2 mol/kg or more.

(3) The secondary battery according to (2), in which the content of the electrolyte salt with respect to the solvent is 3 mol/kg or more.

(4) The secondary battery according to any one of (1) to (3), in which
the solvent includes propylene carbonate and the electrolyte salt includes lithium tetrafluoroborate ($LiBF_4$),
the solvent includes propylene carbonate and the electrolyte salt includes lithium hexafluorophosphate ($LiPF_6$), or
the solvent includes acetonitrile and the electrolyte salt includes lithium bis(fluorosulfonyl)amide ($LiN(SO_2F)_2$).

(5) The secondary battery according to any one of (1) to (4), in which the titanium-containing compound includes one or more of a titanium oxide represented by the following formula (1) and respective lithium-titanium composite oxides represented by the following formulas (2), (3), and (4), $$TiO_w \tag{1}$$

where w satisfies $1.85 \leq w \leq 2.15$, $$Li[Li_xM1_{(1-3x)/2}Ti_{(3+x)/2}]O_4 \tag{2}$$

where M1 is one or more of magnesium (Mg), calcium (Ca), copper (Cu), zinc (Zn), and strontium (Sr), and "x" satisfies $0 \leq x \leq 1/3$, $$Li[Li_yM2_{1-3y}Ti_{1+2y}]O_4 \tag{3}$$

where M2 is one or more of aluminum (Al), scandium (Sc), chromium (Cr), manganese (Mn), iron (Fe), germanium (Ge), gallium (Ga), and yttrium (Y), and "y" satisfies $0 \leq y \leq 1/3$, and $$Li[Li_{1/3}M3_zTi_{(5/3-z)}]O_4 \tag{4}$$

where M3 is one or more of vanadium (V), zirconium (Zr), and niobium (Nb), and "z" satisfies $0 \leq z \leq 2/3$.

(6) The secondary battery according to any one of (1) to (5), in which the secondary battery is a lithium-ion secondary battery.

(7) A battery pack, including:
the secondary battery according to any one of (1) to (6);
a controller that controls an operation of the secondary battery; and
a switch section that switches the operation of the secondary battery in accordance with an instruction from the controller.

(8) An electric vehicle, including:
the secondary battery according to any one of (1) to (6);
a converter that converts electric power supplied from the secondary battery into drive power;
a drive section that operates in accordance with the drive power; and
a controller that controls an operation of the secondary battery.

(9) An electric power storage system, including:
the secondary battery according to any one of (1) to (6);
one or more electric devices that are supplied with electric power from the secondary battery; and
a controller that controls the supplying of the electric power from the secondary battery to the one or more electric devices.

(10) An electric power tool, including:
the secondary battery according to any one of (1) to (6); and
a movable section that is supplied with electric power from the secondary battery.

(11) An electronic apparatus including the secondary battery according to any one of (1) to (6) as an electric power supply source.

It should be understood by those skilled in the art that various modifications, combinations, sub-combinations and alterations may occur depending on design requirements and other factors insofar as they are within the scope of the appended claims or the equivalents thereof.

What is claimed is:

1. A secondary battery, comprising:
a cathode including a cathode current collector and a first cathode active material layer, the first cathode active layer provided on the cathode current collector;

an anode including an anode current collector and a first anode active material layer, the first anode active material layer provided on the anode current collector to face the first cathode active material layer and including a titanium-containing compound;

an intermediate electrode provided between the cathode and the anode and including an intermediate current collector, a second anode active material layer, and a second cathode active material layer, the second anode active material layer provided on the intermediate current collector to face the first cathode active material layer and including the titanium-containing compound, and the second cathode active material layer provided on the intermediate current collector to face the first anode active material layer;

an electrolytic solution including a solvent and an electrolyte salt and having number of molecules of the electrolyte salt equal to or larger than number of molecules of the solvent;

a first separator provided between the cathode and the intermediate electrode; and a second separator provided between the anode and the intermediate electrode.

2. The secondary battery according to claim 1, wherein a content of the electrolyte salt with respect to the solvent is 2 mol/kg or more.

3. The secondary battery according to claim 2, wherein the content of the electrolyte salt with respect to the solvent is 3 mol/kg or more.

4. The secondary battery according to claim 1, wherein the solvent includes propylene carbonate and the electrolyte salt includes lithium tetrafluoroborate (LiBF$_4$), the solvent includes propylene carbonate and the electrolyte salt includes lithium hexafluorophosphate (LiPF$_6$), or the solvent includes acetonitrile and the electrolyte salt includes lithium bis(fluorosulfonyl)amide (LiN(SO$_2$F)$_2$).

5. The secondary battery according to claim 1, wherein the titanium-containing compound includes one or more of a titanium oxide represented by the following formula (1) and respective lithium-titanium composite oxides represented by the following formulas (2), (3), and (4), $$TiO_w \quad (1)$$

where w satisfies $1.85<w\leq2.15$, $$Li[Li_xM1_{(1-3x)/2}Ti_{(3+x)/2}]O_4 \quad (2)$$

where M1 is one or more of magnesium (Mg), calcium (Ca), copper (Cu), zinc (Zn), and strontium (Sr), and "x" satisfies $0\leq x\leq 1/3$, $$Li[Li_yM2_{1-3y}Ti_{1+2y}]O_4 \quad (3)$$

where M2 is one or more of aluminum (Al), scandium (Sc), chromium (Cr), manganese (Mn), iron (Fe), germanium (Ge), gallium (Ga), and yttrium (Y), and "y" satisfies $0\leq x\leq 1/3$, and $$Li[Li_{1/3}M3_zTi_{(5/3-z)}]O_4 \quad (4)$$

where M3 is one or more of vanadium (V), zirconium (Zr), and niobium (Nb), and "z" satisfies $0\leq z\leq 2/3$.

6. The secondary battery according to claim 1, wherein the secondary battery is a lithium-ion secondary battery.

7. A battery pack, comprising:
a secondary battery;
a controller that controls an operation of the secondary battery; and
a switch section that switches the operation of the secondary battery in accordance with an instruction from the controller,
the secondary battery including
a cathode including a cathode current collector and a first cathode active material layer, the first cathode active layer provided on the cathode current collector,
an anode including an anode current collector and a first anode active material layer, the first anode active material layer provided on the anode current collector to face the first cathode active material layer and including a titanium-containing compound,
an intermediate electrode provided between the cathode and the anode and including an intermediate current collector, a second anode active material layer, and a second cathode active material layer, the second anode active material layer provided on the intermediate current collector to face the first cathode active material layer and including the titanium-containing compound, and the second cathode active material layer provided on the intermediate current collector to face the first anode active material layer,
an electrolytic solution including a solvent and an electrolyte salt and having number of molecules of the electrolyte salt equal to or larger than number of molecules of the solvent,
a first separator provided between the cathode and the intermediate electrode, and
a second separator provided between the anode and the intermediate electrode.

8. An electric vehicle, comprising:
a secondary battery;
a converter that converts electric power supplied from the secondary battery into drive power;
a drive section that operates in accordance with the drive power; and
a controller that controls an operation of the secondary battery,
the secondary battery including
a cathode including a cathode current collector and a first cathode active material layer, the first cathode active layer provided on the cathode current collector,
an anode including an anode current collector and a first anode active material layer, the first anode active material layer provided on the anode current collector to face the first cathode active material layer and including a titanium-containing compound,
an intermediate electrode provided between the cathode and the anode and including an intermediate current collector, a second anode active material layer, and a second cathode active material layer, the second anode active material layer provided on the intermediate current collector to face the first cathode active material layer and including the titanium-containing compound, and the second cathode active material layer provided on the intermediate current collector to face the first anode active material layer,
an electrolytic solution including a solvent and an electrolyte salt and having number of molecules of the electrolyte salt equal to or larger than number of molecules of the solvent,
a first separator provided between the cathode and the intermediate electrode, and
a second separator provided between the anode and the intermediate electrode.

9. An electric power storage system, comprising:
a secondary battery;
one or more electric devices that are supplied with electric power from the secondary battery; and
a controller that controls the supplying of the electric power from the secondary battery to the one or more electric devices,
the secondary battery including
a cathode including a cathode current collector and a first cathode active material layer, the first cathode active layer provided on the cathode current collector,
an anode including an anode current collector and a first anode active material layer, the first anode active material layer provided on the anode current collector to face the first cathode active material layer and including a titanium-containing compound,
an intermediate electrode provided between the cathode and the anode and including an intermediate current collector, a second anode active material layer, and a second cathode active material layer, the second anode active material layer provided on the intermediate current collector to face the first cathode active material layer and including the titanium-containing compound, and the second cathode active material layer provided on the intermediate current collector to face the first anode active material layer,
an electrolytic solution including a solvent and an electrolyte salt and having number of molecules of the electrolyte salt equal to or larger than number of molecules of the solvent,
a first separator provided between the cathode and the intermediate electrode, and
a second separator provided between the anode and the intermediate electrode.

10. An electric power tool, comprising:
a secondary battery; and
a movable section that is supplied with electric power from the secondary battery,
the secondary battery including
a cathode including a cathode current collector and a first cathode active material layer, the first cathode active layer provided on the cathode current collector,
an anode including an anode current collector and a first anode active material layer, the first anode active material layer provided on the anode current collector to face the first cathode active material layer and including a titanium-containing compound,
an intermediate electrode provided between the cathode and the anode and including an intermediate current collector, a second anode active material layer, and a second cathode active material layer, the second anode active material layer provided on the intermediate current collector to face the first cathode active material layer and including the titanium-containing compound, and the second cathode active material layer provided on the intermediate current collector to face the first anode active material layer,
an electrolytic solution including a solvent and an electrolyte salt and having number of molecules of the electrolyte salt equal to or larger than number of molecules of the solvent,
a first separator provided between the cathode and the intermediate electrode, and
a second separator provided between the anode and the intermediate electrode.

11. An electronic apparatus comprising a secondary battery as an electric power supply source, the secondary battery including
a cathode including a cathode current collector and a first cathode active material layer, the first cathode active layer provided on the cathode current collector,
an anode including an anode current collector and a first anode active material layer, the first anode active material layer provided on the anode current collector to face the first cathode active material layer and including a titanium-containing compound,
an intermediate electrode provided between the cathode and the anode and including an intermediate current collector, a second anode active material layer, and a second cathode active material layer, the second anode active material layer provided on the intermediate current collector to face the first cathode active material layer and including the titanium-containing compound, and the second cathode active material layer provided on the intermediate current collector to face the first anode active material layer,
an electrolytic solution including a solvent and an electrolyte salt and having number of molecules of the electrolyte salt equal to or larger than number of molecules of the solvent,
a first separator provided between the cathode and the intermediate electrode, and
a second separator provided between the anode and the intermediate electrode.

\* \* \* \* \*